(12) United States Patent
Yamamoto et al.

(10) Patent No.: US 8,678,898 B2
(45) Date of Patent: Mar. 25, 2014

(54) INFORMATION STORAGE MEDIUM, TERMINAL, IMAGE GENERATION METHOD, AND NETWORK SYSTEM

(75) Inventors: Kazuo Yamamoto, Kawasaki (JP);
Masayoshi Noda, Yokohama (JP);
Masaya Amano, Kawasaki (JP);
Yoshitaka Inoue, Yokohama (JP);
Kazuya Watanabe, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 399 days.

(21) Appl. No.: 13/073,228

(22) Filed: Mar. 28, 2011

(65) Prior Publication Data
US 2011/0245942 A1    Oct. 6, 2011

(30) Foreign Application Priority Data
Mar. 31, 2010    (JP) .................... 2010-84668

(51) Int. Cl.
*A63F 9/00*    (2006.01)
*A63F 13/00*    (2006.01)
*G06F 17/00*    (2006.01)

(52) U.S. Cl.
USPC .................................. 463/7; 463/6

(58) Field of Classification Search
USPC .................................. 463/31, 42
See application file for complete search history.

(56) References Cited

FOREIGN PATENT DOCUMENTS

| JP | A-2005-319108 | 11/2005 |
| JP | A-2007-143668 | 6/2007 |

OTHER PUBLICATIONS

Age of Empires II. Created 1999.*
Age of Empires 3, http://aoe3.heavengames.com/gameinfo/twc/features. Created 2008.*
GameSpot Age of Empires II. Created Jan. 4, 2001.*
Border Break, Electronic Shock Arcade Card Game, ASCH Media Works Inc., Dec. 11, 2009, vol. 15, 40$^{th}$ issue (with partial translation).
QBIST Corporation, ACECOMBAT6, Battle Lines for Freedom-Complete Guide, SOFTBANK Creative Corp., Jan. 11, 2008, 1$^{st}$ Edition (with partial translation).
Sawamura, Ken et al., Space Battleship Yamato Collapse of Double Galaxy [Complete Guide], Enterbrain, Inc., May 31, 2005, 1$^{st}$ Edition (with partial translation).
Mileplus Corporation, AERODANCINC 4 New Generation Complete Guide, SOFTBANK Publishing Corp., Aug. 2, 2002, 1$^{st}$ Edition (with partial translation).

* cited by examiner

*Primary Examiner* — Omkar Deodhar
*Assistant Examiner* — Reginald Renwick
(74) *Attorney, Agent, or Firm* — Oliff PLC

(57) ABSTRACT

A terminal sets a search range that includes a player object and is smaller than a radar map range in an object space based on the position of the player object, and generates a radar map image that indicates the position of the player object and the position of an enemy object within the search range.

12 Claims, 24 Drawing Sheets

FIG. 6

| ID | TYPE | ENEMY SEARCH RANGE (RADIUS) | STEALTH STATE FLAG | ATTACK CAPABILITY | DEFENSE CAPABILITY |
|---|---|---|---|---|---|
| 1 | LARGE FIGHTER AIRCRAFT | 7 | 0 | 80 | 70 |
| 2 | PRACTICAL FIGHTER AIRCRAFT | 6 | 0 | 70 | 65 |
| 3 | SUPERIOR FIGHTER | 5 | 0 | 75 | 50 |
| 4 | STEALTH PLANE | 7 | 1 | 80 | 70 |
| 5 | PASSENGER PLANE | 3 | 0 | 20 | 70 |
| 6 | HELICOPTER | 5 | 1 | 50 | 20 |
| ⋮ | ⋮ | ⋮ | ⋮ | ⋮ | ⋮ |

FIG. 14

| ID | OBJECT | JAMMING FUNCTION FLAG | JAMMING RANGE |
|---|---|---|---|
| 1 | POB | 0 | 2 |
| 2 | QOB | 1 | 5 |
| 3 | EOB1 | 1 | 3 |
| 4 | EOB2 | 0 | 1 |
| ⋮ | ⋮ | ⋮ | ⋮ |

FIG. 22
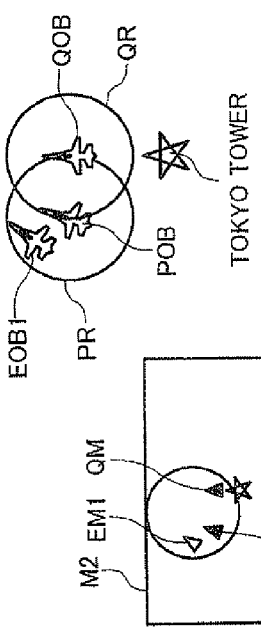
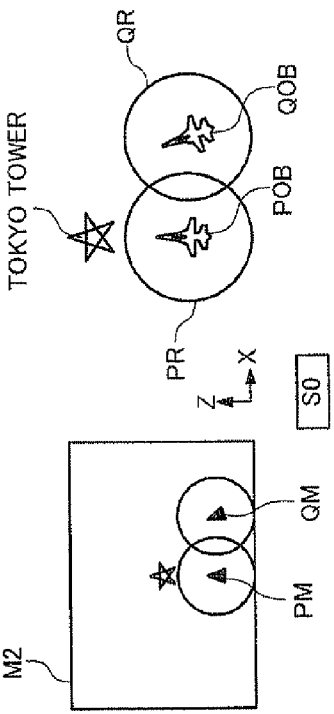
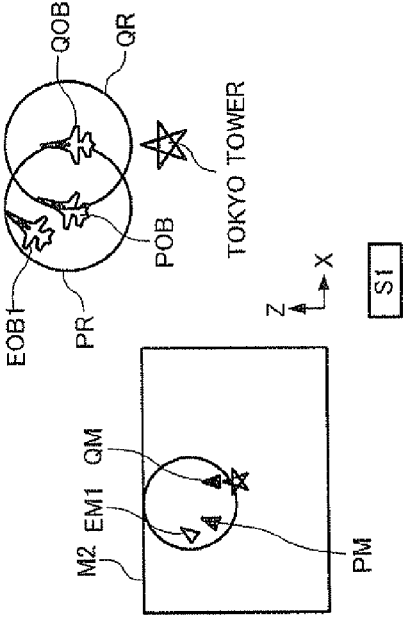

INFORMATION STORAGE MEDIUM, TERMINAL, IMAGE GENERATION METHOD, AND NETWORK SYSTEM

Japanese Patent Application No. 2010-84668 filed on Mar. 31, 2010, is hereby incorporated by reference in its entirety.

BACKGROUND OF THE INVENTION

The present invention relates to an information storage medium, a terminal, an image generation method, and a network system.

A terminal that generates an image viewed from a virtual camera (given viewpoint) in an object space (virtual three-dimensional space) has been known, and is very popular as a means that allows the player to experience virtual reality. For example, a terminal that is used for a shooting game that allows the player to attack a target object by firing a missile or a machine gun, has been known (JP-A-2005-319108).

A radar map image that is displayed on a screen may be generated when implementing a shooting game. For example, a radar map image that indicates the positional relationship between a player object (i.e., an object operated by the player) and an enemy object is displayed on a screen.

The radar map image is displayed so that the player can easily find the enemy object in the object space. However, since the player can easily determine the positional relationship between the player object and the enemy object as a result of displaying the radar map image, it may be unnecessary for the player to search for the enemy object (i.e., the player may not fully enjoy searching for the enemy object).

SUMMARY

According to a first aspect of the invention, there is provided a non-transitory computer-readable information storage medium storing a program that generates a radar map image and a game image displayed on a screen, the program causing a computer to function as:

a movement processing section that moves a player object in an object space based on information input from an input section;

a setting section that sets a radar map range including the player object in the object space based on a position of the player object;

a radar map image generation section that generates an image that indicates a position of an object within the radar map range as the radar map image;

a game image generation section that generates an image viewed from a virtual camera in the object space as the game image; and a game calculation section that performs a battle game calculation process on the player object and an enemy object, the setting section setting a search range in the object space based on the position of the player object, the search range including the player object and being smaller than the radar map range; and the radar map image generation section generating the radar map image that indicates the position of the player object and a position of an enemy object within the search range.

According to a second aspect of the invention, there is provided a terminal that generates a radar map image and a game image displayed on a screen, the terminal including:

a movement processing section that moves a player object in an object space based on information input from an input section;

a setting section that sets a radar map range including the player object in the object space based on a position of the player object;

a radar map image generation section that generates an image that indicates a position of an object within the radar map range as the radar map image;

a game image generation section that generates an image viewed from a virtual camera in the object space as the game image; and a game calculation section that performs a battle game calculation process on the player object and an enemy object, the setting section setting a search range in the object space based on the position of the player object, the search range including the player object and being smaller than the radar map range; and the radar map image generation section generating the radar map image that indicates the position of the player object and a position of an enemy object within the search range.

According to a third aspect of the invention, there is provided an image generation method that is implemented by a terminal that generates a radar map image and a game image displayed on a screen, the image generation method including:

moving a player object in an object space based on information input from an input section;

setting a radar map range including the player object in the object space based on a position of the player object;

generating an image that indicates a position of an object within the radar map range as the radar map image;

generating an image viewed from a virtual camera in the object space as the game image;

performing a battle game calculation process on the player object and an enemy object;

setting a search range in the object space based on the position of the player object, the search range including the player object and being smaller than the radar map range; and generating the radar map image that indicates the position of the player object and a position of an enemy object within the search range.

According to a fourth aspect of the invention, there is provided a network system that performs a battle game calculation process on a first object operated by a first terminal and a second object operated by a second terminal, and generates a radar map image and a game image displayed on a screen of each of the first terminal and the second terminal, each of the first terminal and the second terminal comprising:

a communication control section that transmits data to and receives data from the other terminal via a network;

a movement processing section that moves one of the first and second objects operated by the terminal in an object space based on information input from an input section, and moves the other of the first and second objects in the object space based on movement data received from the other of the first and second terminals;

a setting section that sets a radar map range including the one of the first and second objects operated by the terminal in the object space based on a position of the one of the first and second objects;

a radar map image generation section that generates an image that indicates a position of an object within the radar map range as the radar map image;

a game image generation section that generates an image viewed from a virtual camera in the object space as the game image; and a game calculation section that performs a battle game calculation process on the first object and the second object, the setting section of the first terminal setting a search range of the first object in the object space based on the position of the first object, the search range of the first object including the first object and being smaller than the radar map range;

the setting section of the second terminal setting a search range of the second object in the object space based on the position of the second object, the search range of the second object including the second object and being smaller than the radar map range;

the radar map image generation section of the first terminal generating the radar map image that indicates the position of the first object and the position of the second object within the search range of the first object; and the radar map image generation section of the second terminal generating the radar map image that indicates the position of the second object and the position of the first object within the search range of the second object.

According to a fifth aspect of the invention, there is provided a network system that performs a battle game calculation process on a first group and a third object operated by a third terminal, the first group being formed of a first object operated by a first terminal and a second object operated by a second terminal, and generates a radar map image and a game image displayed on a screen of each of the first terminal, the second terminal, and the third terminal, each of the first terminal, the second terminal, and the third terminal comprising:

a communication control section that transmits data to and receives data from each of the other terminals via a network;

a movement processing section that moves one of the first, second and third objects operated by the terminal in an object space based on information input from an input section, and moves the other two of the first, second and third objects in the object space based on movement data received from the other two of the first, second and third terminals;

a setting section that sets a radar map range including the one of the first, second and third objects operated by terminal in the object space based on a position of the one of the first, second and third objects;

a radar map image generation section that generates an image that indicates a position of an object within the radar map range as the radar map image;

a game image generation section that generates an image viewed from a virtual camera in the object space as the game image; and a game calculation section that performs a battle game calculation process on the first group and the third object, the setting section of each of the first and second terminals belonging to the first group setting each of search ranges corresponding to each object belonging to the first group in the object space based on the position of each object belonging to the first group, the search range including the object belonging to the first group and being smaller than the radar map range;

the setting section of the third terminal setting a search range of the third object in the object space based on the position of the third object, the search range of the third object including the third object and being smaller than the radar map range;

the radar map image generation section of each of the first and second terminals belonging to the first group generating the radar map image that indicates the position of the object belonging to the first group and the position of the third object within the search range of at least one of the first and second objects; and the radar map image generation section of the third terminal generating the radar map image that indicates the position of the third object and the position of the object belonging to the first group within the search range of the third object.

According to a sixth aspect of the invention, there is provided a network system that performs a battle game calculation process on a first group formed of objects respectively operated by a plurality of terminals and a second group formed of objects respectively operated by a plurality of terminals, and generates a radar map image and a game image displayed on a screen of each of the terminals, each of the terminals comprising:

a communication control section that transmits data to and receives data from each of the other terminals via a network;

a movement processing section that moves one of the objects operated by the terminal in an object space based on information input from an input section, and moves the others of the objects in the object space based on movement data received from the others of the terminals;

a setting section that sets a radar map range including the one of the objects operated by the terminal in the object space based on a position of the one of the objects;

a radar map image generation section that generates an image that indicates a position of an object within the radar map range as the radar map image;

a game image generation section that generates an image viewed from a virtual camera in the object space as the game image; and a game calculation section that performs a battle game calculation process on the first group and the second group, the setting section of each of the plurality of terminals belonging to the first group setting each of search ranges corresponding to each object belonging to the first group in the object space based on the position of each object belonging to the first group, the search range including the object belonging to the first group and being smaller than the radar map range;

the setting section of each of the plurality of terminals belonging to the second group setting each of search ranges corresponding to each object belonging to the second group in the object space based on the position of each object belonging to the second group, the search range including the object belonging to the second group and being smaller than the radar map range;

the radar map image generation section of each of the plurality of terminals belonging to the first group generating the radar map image that indicates the position of the object belonging to the first group and the position of the object belonging to the second group within the search range of the object belonging to the first group; and the radar map image generation section of each of the plurality of terminals belonging to the second group generating the radar map image that indicates the position of the object belonging to the second group and the position of the object belonging to the first group within the search range of the object belonging to the second group.

BRIEF DESCRIPTION OF THE SEVERAL VIEWS OF THE DRAWING

FIG. 6 illustrates an example of a table (database) in which data is linked to each object.

FIG. 14 illustrates an example of a table (database) in which jamming function data is linked to each object.

FIG. 22 is a diagram illustrating a radar map image of each terminal.

DETAILED DESCRIPTION OF THE EMBODIMENT

Figure 1:
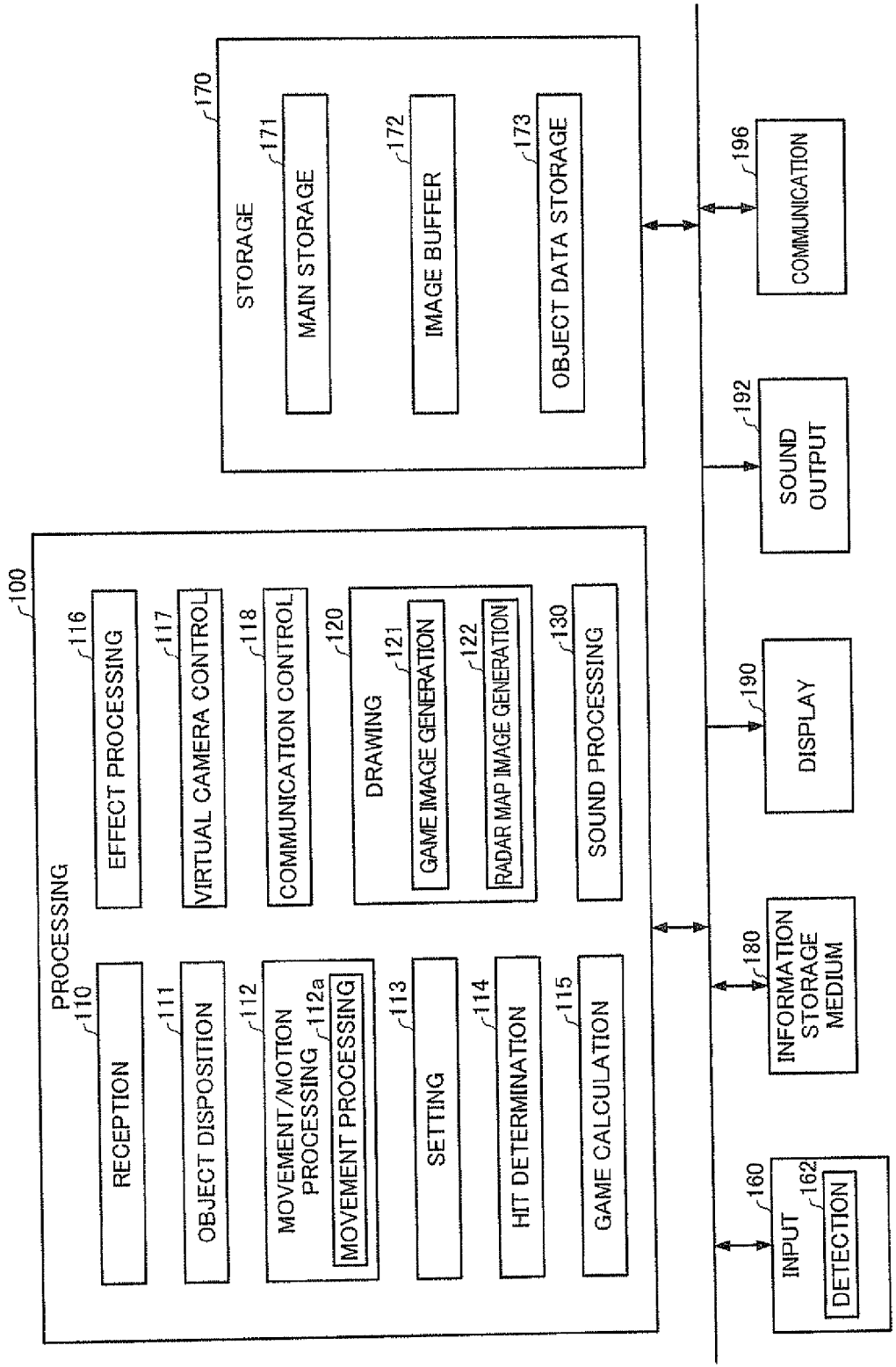
FIG. 1 illustrates an example of the configuration of a terminal (computer) according to one embodiment of the invention.

The invention may provide an information storage medium, a terminal, an image generation method, and a network system that generate a radar map image that allows the player to more interestingly search for an enemy object.

(1) According to one embodiment of the invention, there is provided a non-transitory computer-readable information storage medium storing a program that generates a radar map image and a game image displayed on a screen, the program causing a computer to function as:

a movement processing section that moves a player object in an object space based on information input from an input section;

a setting section that sets a radar map range including the player object in the object space based on a position of the player object;

a radar map image generation section that generates an image that indicates a position of an object within the radar map range as the radar map image;

a game image generation section that generates an image viewed from a virtual camera in the object space as the game image; and a game calculation section that performs a battle game calculation process on the player object and an enemy object, the setting section setting a search range in the object space based on the position of the player object, the search range including the player object and being smaller than the radar map range; and the radar map image generation section generating the radar map image that indicates the position of the player object and a position of an enemy object within the search range.

Specifically, since the search range that includes the player object and is smaller than the radar map range is set based on the position of the player object, and the radar map image that indicates the position of the player object and the position of the enemy object within the search range is generated, the player can more interestingly search for the enemy object.

(2) In the above information storage medium, the game calculation section may perform a battle game calculation process on an ally group and the enemy object, the ally group being formed of the player object and an ally object;

the setting section may set an ally search range in the object space based on a position of the ally object, the ally search range including the ally object and being smaller than the radar map range; and the radar map image generation section may generate the radar map image that indicates a position of an enemy object within the ally search range.

Specifically, since the ally search range that includes the ally object and is smaller than the radar map range is set based on the position of the ally object, and the radar map image that indicates the position of the enemy object within the ally search range is generated, the player can easily search for the enemy object in cooperation with the ally player (object). This makes it possible to implement a game that prompts the players to unite which achieves a more interesting enemy search process.

(3) In the above information storage medium, the radar map image generation section may generate the radar map image that does not indicate the position of the enemy object within the search range when a special state of the enemy object is enabled.

Specifically, since the position of the enemy object within the search range is not displayed within the radar map image when the special state of the enemy object is enabled, a more interesting game can be implemented.

(4) In the above information storage medium, the radar map image generation section may enable the special state of a first enemy object for which the special state has been disabled when the first enemy object is within a special range that is set based on a position of a second enemy object for which the special state is enabled.

Specifically, since the special state of the first enemy object for which the special state has been disabled is enabled when the first enemy object is within the special range that is set based on the position of the second enemy object for which the special state is enabled, the enemy object can be displayed within the radar map image in various ways.

(5) In the above information storage medium, the setting section may set an approach range inside the search range; and the radar map image generation section may disable the special state of an enemy object for which the special state has been enabled when the enemy object is within the approach range.

Specifically, since the special state of the enemy object for which the special state has been enabled is disabled when the enemy object is within the approach range, a consistent radar map image can be generated.

(6) In the above information storage medium, the program may cause the computer to further function as a communication control section that transmits data to and receives data from a second computer via a network;

the game calculation section may perform a battle game calculation process on an ally group and the enemy object, the ally group being formed by the player object and an ally object that is an object operated by the second computer;

the movement processing section may move the ally object based on movement data received from the second computer;

the setting section may set an ally search range in the object space based on position data about the ally object received from the second computer, the ally search range including the ally object and being smaller than the radar map range; and the radar map image generation section may generate the radar map image that indicates a position of an enemy object within the ally search range.

Specifically, since the player can search for the enemy object in cooperation with the player who operates the second computer, an online game that provides novel cooperative play can be implemented.

(7) In the above information storage medium, the program may cause the computer to further function as a communication control section that transmits data to and receives data from a third computer via a network;

the game calculation section may perform a battle game calculation process on the player object and an enemy object that is an object operated by the third computer; and the movement processing section may move the enemy object based on movement data received from the third computer.

(8) In the above information storage medium, the setting section may set the size of the search range based on the type of the player object.

Specifically, since the size of the search range differs depending on the type of the player object, the player can more interestingly search for the enemy object.

(9) According to another embodiment of the invention, there is provided a terminal that generates a radar map image and a game image displayed on a screen, the terminal including:

a movement processing section that moves a player object in an object space based on information input from an input section;

a setting section that sets a radar map range including the player object in the object space based on a position of the player object;

a radar map image generation section that generates an image that indicates a position of an object within the radar map range as the radar map image;

a game image generation section that generates an image viewed from a virtual camera in the object space as the game image; and a game calculation section that performs a battle game calculation process on the player object and an enemy object, the setting section setting a search range in the object space based on the position of the player object, the search range including the player object and being smaller than the radar map range; and the radar map image generation section generating the radar map image that indicates the position of the player object and a position of an enemy object within the search range.

(10) According to another embodiment of the invention, there is provided an image generation method that is implemented by a terminal that generates a radar map image and a game image displayed on a screen, the image generation method including:

moving a player object in an object space based on information input from an input section;

setting a radar map range including the player object in the object space based on a position of the player object;

generating an image that indicates a position of an object within the radar map range as the radar map image;

generating an image viewed from a virtual camera in the object space as the game image;

performing a battle game calculation process on the player object and an enemy object;

setting a search range in the object space based on the position of the player object, the search range including the player object and being smaller than the radar map range; and generating the radar map image that indicates the position of the player object and a position of an enemy object within the search range.

(11) According to another embodiment of the invention, there is provided a network system that performs a battle game calculation process on a first object operated by a first terminal and a second object operated by a second terminal, and generates a radar map image and a game image displayed on a screen of each of the first terminal and the second terminal, each of the first terminal and the second terminal comprising:

a communication control section that transmits data to and receives data from the other terminal via a network;

a movement processing section that moves one of the first and second objects operated by the terminal in an object space based on information input from an input section, and moves the other of the first and second objects in the object space based on movement data received from the other of the first and second terminals;

a setting section that sets a radar map range including the one of the first and second objects operated by the terminal in the object space based on a position of the one of the first and second objects;

a radar map image generation section that generates an image that indicates a position of an object within the radar map range as the radar map image;

a game image generation section that generates an image viewed from a virtual camera in the object space as the game image; and a game calculation section that performs a battle game calculation process on the first object and the second object, the setting section of the first terminal setting a search range of the first object in the object space based on the position of the first object, the search range of the first object including the first object and being smaller than the radar map range;

the setting section of the second terminal setting a search range of the second object in the object space based on the position of the second object, the search range of the second object including the second object and being smaller than the radar map range;

the radar map image generation section of the first terminal generating the radar map image that indicates the position of the first object and the position of the second object within the search range of the first object; and the radar map image generation section of the second terminal generating the radar map image that indicates the position of the second object and the position of the first object within the search range of the second object.

According to the above embodiments, the player can more interestingly search for the enemy object. According to the above embodiments, an online battle game can be implemented. Specifically, the search range of the enemy object is set in the object space of the terminal of the opposing player, and the player object is displayed on the radar map displayed on the screen of the terminal of the opposing player when the player object is within the enemy search range of the enemy object. Therefore, the player must move the player object so that the player object does not enter the search range of the enemy object. This makes it possible to provide a novel interesting game.

(12) According to another embodiment of the invention, there is provided a network system that performs a battle game calculation process on a first group and a third object operated by a third terminal, the first group being formed of a first object operated by a first terminal and a second object operated by a second terminal, and generates a radar map image and a game image displayed on a screen of each of the first terminal, the second terminal, and the third terminal, each of the first terminal, the second terminal, and the third terminal comprising:

a communication control section that transmits data to and receives data from each of the other terminals via a network;

a movement processing section that moves one of the first, second and third objects operated by the terminal in an object space based on information input from an input section, and moves the other two of the first, second and third objects in the object space based on movement data received from the other two of the first, second and third terminals;

a setting section that sets a radar map range including the one of the first, second and third objects operated by terminal in the object space based on a position of the one of the first, second and third objects;

a radar map image generation section that generates an image that indicates a position of an object within the radar map range as the radar map image;

a game image generation section that generates an image viewed from a virtual camera in the object space as the game image; and a game calculation section that performs a battle game calculation process on the first group and the third object, the setting section of each of the first and second terminals belonging to the first group setting each of search ranges corresponding to each object belonging to the first group in the object space based on the position of each object belonging to the first group, the search range including the object belonging to the first group and being smaller than the radar map range;

the setting section of the third terminal setting a search range of the third object in the object space based on the position of the third object, the search range of the third object including the third object and being smaller than the radar map range;

the radar map image generation section of each of the first and second terminals belonging to the first group generating the radar map image that indicates the position of the object belonging to the first group and the position of the third object within the search range of at least one of the first and second objects; and the radar map image generation section of the third terminal generating the radar map image that indicates the position of the third object and the position of the object belonging to the first group within the search range of the third object.

This makes it possible for the player to easily find the enemy object in cooperation with the ally player, and implement a game that prompts the players to unite. Moreover, an online battle game can be implemented. Specifically, the search range of the enemy object is set in the object space of the terminal of the opposing player, and the player object is displayed on the radar map displayed on the screen of the terminal of the opposing player when the player object is within the enemy search range of the enemy object. Therefore, the player must move the player object so that the player object does not enter the search range of the enemy object. This makes it possible to provide a novel interesting game.

(13) According to another embodiment of the invention, there is provided a network system that performs a battle game calculation process on a first group formed of objects respectively operated by a plurality of terminals and a second group formed of objects respectively operated by a plurality of terminals, and generates a radar map image and a game image displayed on a screen of each of the terminals, each of the terminals comprising:

a communication control section that transmits data to and receives data from each of the other terminals via a network;

a movement processing section that moves one of the objects operated by the terminal in an object space based on information input from an input section, and moves the others of the objects in the object space based on movement data received from the others of the terminals;

a setting section that sets a radar map range including the one of the objects operated by the terminal in the object space based on a position of the one of the objects;

a radar map image generation section that generates an image that indicates a position of an object within the radar map range as the radar map image;

a game image generation section that generates an image viewed from a virtual camera in the object space as the game image; and a game calculation section that performs a battle game calculation process on the first group and the second group, the setting section of each of the plurality of terminals belonging to the first group setting each of search ranges corresponding to each object belonging to the first group in the object space based on the position of each object belonging to the first group, the search range including the object belonging to the first group and being smaller than the radar map range;

the setting section of each of the plurality of terminals belonging to the second group setting each of search ranges corresponding to each object belonging to the second group in the object space based on the position of each object belonging to the second group, the search range including the object belonging to the second group and being smaller than the radar map range;

the radar map image generation section of each of the plurality of terminals belonging to the first group generating the radar map image that indicates the position of the object belonging to the first group and the position of the object belonging to the second group within the search range of the object belonging to the first group; and the radar map image generation section of each of the plurality of terminals belonging to the second group generating the radar map image that indicates the position of the object belonging to the second group and the position of the object belonging to the first group within the search range of the object belonging to the second group.

This makes it possible for the player to easily find the enemy object in cooperation with the ally player, and implement a game that prompts the players to unite. Moreover, an online battle game can be implemented. Specifically, the search range of the enemy object is set in the object space of the terminal of the opposing player, and the player object is displayed on the radar map displayed on the screen of the terminal of the opposing player when the player object is within the enemy search range of the enemy object. Therefore, the player must move the player object so that the player object does not enter the search range of the enemy object. This makes it possible to provide a novel interesting game. It is also possible to implement an interesting game in which the battle result is determined depending on unity within each group.

(14) In each of the above network systems, each of the first terminal and the second terminal further comprises an effect processing section that performs an alarm process;

the setting section of each of the first terminal and the second terminal sets a search range of an enemy object that is one of the first and the second objects operated by the other of the first and second terminals based on the position of the enemy object; and the effect processing section performs the alarm process when one of the first and second objects operated by the one of the first and second terminals is within the search range of the enemy object.

Specifically, since the alarm process is performed when the object operated by the terminal is within the search range of at least one enemy object, the player who operates the terminal can be notified that the position of the player object is known by the opposing player.

Exemplary embodiments of the invention are described below. Note that the following embodiments do not unduly limit the scope of the invention as stated in the claims. Note also that all of the elements described below should not necessarily be taken as essential elements of the invention.

1. Configuration

FIG. 1 illustrates an example of a functional block diagram of a terminal (computer, image generation device, game device, mobile phone, portable terminal, or portable game device) according to one embodiment of the invention. The terminal according to this embodiment may have a configuration in which some of the elements (sections) illustrated in FIG. 1 are omitted.

An input section 160 is an input device (controller) that allows the player (operator) to input information, and outputs the information input by the player to a processing section. The input section 160 includes a detection section 162 that detects the information (input signal) input by the player. The input section 160 may include a lever, a button, a steering wheel, a microphone, a touch panel display, or the like. The input section 160 may include a vibration section that vibrates based on a vibration signal.

The input section 160 may be an input device that includes an acceleration sensor that detects three-axis accelerations, a gyrosensor that detects angular velocity, and an imaging section. For example, the input section 160 may be held or worn by the player. The input section 160 may be an input device that imitates a tool, such as a sword-type controller or a gun-type controller that is held by the player, or a glove-type controller that is worn by the player. The input section 160 may be a terminal (mobile phone, portable terminal, or portable game device) that is integrated with an input device.

A storage section 170 serves as a work area for a processing section 100, a communication section 196, and the like. The function of the storage section 170 may be implemented by a RAM (VRAM) or the like.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), or the like. The processing section 100 executes various processes according to this embodiment based on a program (data) stored in the information storage medium 180. A program that causes a computer to function as each section according to this embodiment (i.e., a program that causes a computer to execute the process of each section) may be stored in the information storage medium 180.

A display section 190 outputs an image generated according to this embodiment. The function of the display section 190 may be implemented by a CRT, an LCD, a touch panel display, a head mount display (HMD), or the like.

A sound output section 192 outputs sound generated according to this embodiment. The function of the sound output section 192 may be implemented by a speaker, a headphone, or the like.

The communication section 196 controls communication with the outside (e.g., another terminal or server). The function of the communication section 196 may be implemented by hardware such as a processor or a communication ASIC, a program, or the like.

Note that the terminal may receive a program (data) that causes a computer to function as each section according to this embodiment from an information storage medium or a storage section included in a server through a network, and may store the received program (data) in the information storage medium 180 or the storage section 170. A case where the terminal operates based on the program (data) received from the server is also included within the scope of the invention.

The processing section 100 (processor) executes a game process, an image generation process, a sound generation process, and the like based on data input from the input section 160, a program, and the like.

The processing section 100 performs various processes using a main storage section 171 of the storage section 170 as a work area. The function of the processing section 100 may be implemented by hardware such as a processor (e.g., CPU or DSP) or an ASIC (e.g., gate array), or a program.

The processing section 100 includes a reception section 110, an object disposition section 111, a movement/motion processing section 112, a setting section 113, a hit determination section 114, a game calculation section 115, an effect processing section 116, a virtual camera control section 117, a communication control section 118, a drawing section 120, and a sound processing section 130. Note that the processing section 100 may have a configuration in which some of these sections are omitted.

The reception section 110 receives information (input information) input by the player. For example, the reception section 110 receives movement input information for moving a player object (first object or object operated by the player), or receives fire input information for firing a bullet (e.g., missile or a bullet from a machine gun) from the player object.

The object disposition section 111 disposes an object in an object space (virtual three-dimensional space). For example, the object disposition section 110 disposes display objects such as a building, a stadium, a car, a tree, a pillar, a wall, or a map (topography) in the object space (within the object space) in addition to the player object and an enemy object (second object, moving object that moves, makes a motion, or attacks based on a computer program, non-player character NPC, or object operated by another player). The term "object space" used herein refers to a virtual game space. For example, the term "object space" used herein refers to a space in which an object is disposed in a three-dimensional coordinate (X, Y, Z) system (e.g., world coordinate system or virtual camera coordinate system).

For example, the object disposition section 111 disposes an object (i.e., an object formed by a primitive such as a polygon, a free-form surface, or a subdivision surface) in the world coordinate system. The object disposition section 111 determines the position and the rotation angle (synonymous with orientation or direction) of the object in the world coordinate system, and disposes the object at the determined position (X, Y, Z) and the determined rotation angle (rotation angles around the X, Y, and Z-axes).

The movement/motion processing section 112 calculates the movement/motion of the object in the object space (within the object space). Specifically, the movement/motion processing section 112 causes the object to move or make a motion (animation) in the object space based on information input from the input section 160, a program (movement/motion algorithm), various types of data (motion data), and the like. More specifically, the movement/motion processing section 112 sequentially calculates object movement information (e.g., moving speed, acceleration, position, and direction) and object motion information (position or rotation angle of each part that forms the object) every frame (e.g., 1/60th of a second). The term "frame" used herein refers to a time unit used when performing the object movement/motion process and the image generation process.

For example, a movement processing section 112a according to this embodiment moves the player object (first object) based on information (movement input information) input from the input section 160, and moves the enemy object based on a movement processing program.

The movement processing section 112a moves a bullet (e.g., missile or a bullet from a machine gun) fired from the object so that the bullet follows a target object. Specifically, the movement processing section 112a moves a bullet that has been fired from the second object at the first object.

When the terminal transmits data to and receives data from another terminal via a network, the movement processing section 112a causes another moving object (i.e., a moving object operated by a player who operates the other terminal) disposed in the object space of the terminal to move or make a motion based on data (e.g., movement information) received from the other terminal. For example, the movement processing section 112a moves an ally object based on movement data received from a second computer. The movement processing section 112a also moves an enemy object based on movement data received from a third computer.

The setting section 113 sets a radar map range (a range of radar map, an extent of radar map, a scope of radar map, volume of radar map) including the player object in the object space based on the position of the player object. When a plurality of terminals transmit data to and receive data from each other via a network to implement an online game, each terminal independently sets the radar map range.

The setting section 113 sets a search range (enemy search range) for each object (e.g., fighter aircraft, tank, and base) belonging to an ally group and each object (e.g., fighter aircraft, tank, and base) belonging to an enemy group in the object space. Specifically, the setting section 113 sets a column that is formed around the position (X, Z) of the object in the XZ plane of the object space and has a radius r and an unlimited height (Y-axis direction) as the search range (enemy search range).

The setting section 113 sets a search range that includes the player object and is smaller than the radar map range in the object space based on the position of the player object. When a plurality of terminals transmits data to and receives data from each other via a network to implement an online game, each terminal independently sets the search range.

The setting section 113 sets an ally search range that includes an ally object and is smaller than the radar map range in the object space based on the position of the ally object. The setting section 113 sets an ally search range that includes the ally object and is smaller than the radar map range in the object space based on position data about the ally object received from a second computer. Specifically, the setting section 113 sets the search range for each object belonging to the ally group (first group) in the object space based on the position of the object, the search range including the object and being smaller than the radar map range.

The setting section 113 may set the search range including an object for each object (e.g., base and tank) belonging to the ally group based on the position of the object.

The setting section 113 sets the search range for each enemy object based on the position of each enemy object. For example, the setting section 113 sets the search range that includes the enemy object and is smaller than the radar map range based on the position of the enemy object.

The setting section 113 may set the search range including an object for each object (e.g., base and tank) belonging to the enemy group based on the position of the object.

The setting section 113 sets the size of the search range based on the type of the object.

The setting section 113 sets an approach range that is smaller than the search range inside the search range set for each object. For example, the setting section 113 sets the approach range that includes the player object and is smaller than the search range based on the position of the player object.

The hit determination section 114 determines whether or not a bullet (e.g., missile) fired from a second object (e.g., enemy object) has hit a first object (e.g., player object). The hit determination section 114 also determines whether or not a bullet fired from the first object has hit the second object.

The game calculation section 115 performs various game processes. For example, the game calculation section 115 starts the game when game start conditions have been satisfied, proceeds with the game, finishes the game when game finish conditions have been satisfied, and performs an ending process when the final stage has been cleared, for example.

For example, the game calculation section 115 performs a battle game calculation process on the player object and the enemy object. The game calculation section 115 also performs a battle game calculation process on the ally group formed by the player object and the ally object and the enemy object. For example, the game calculation section 115 performs a battle game calculation process on the ally group formed by the player object and the ally object (object operated by a second computer) and the enemy object. The game calculation section 115 performs a battle game calculation process on the player object and the enemy object (object operated by a third computer).

The game calculation section 115 updates a parameter of each object (including the player object and the enemy object). The game calculation section 115 updates a cumulative damage value I each time a bullet has hit the player object. For example, the game calculation section 115 determines that the player object has been shot down when the cumulative damage value I of the player object has reached a maximum value (I=100), and finishes the game process. The game calculation section 115 determines that the game stage has been cleared when the total cumulative damage value I of the enemy objects has reached a maximum value.

The effect processing section 116 performs a given effect process. The effect processing section 116 performs an alarm process when the object operated by the terminal is present within the search range of at least one enemy object. For example, the effect processing section 116 blinks the frame of the radar map image, or changes the color of an HUD image from a normal color (e.g., green) to an alarm color (yellow). The sound processing section 130 may generate an alarm sound as the alarm process.

The virtual camera control section 117 controls the virtual camera (viewpoint) for generating an image viewed from a given (arbitrary) viewpoint in the object space (within the object space). When generating a three-dimensional image, the virtual camera control section 117 controls the position (X, Y, Z) and the rotation angle (e.g., the rotation angle of the virtual camera when the virtual camera is rotated clockwise around each of the X, Y, and Z axes) of the virtual camera in the world coordinate system. The virtual camera control section 117 controls at least one of the viewpoint position, the line-of-sight direction, the angle of view, the moving direction, and the moving speed of the virtual camera.

Figure 2A:
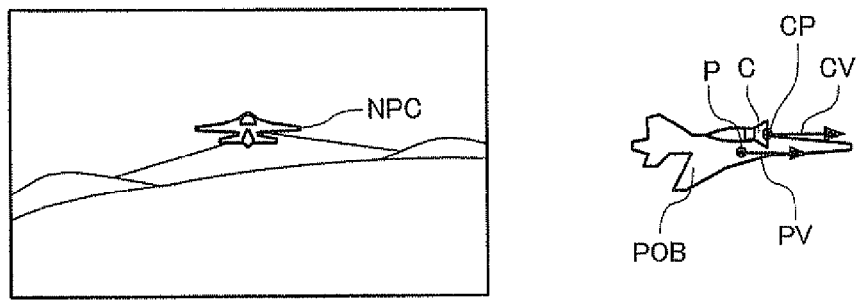
FIGS. 2A to 2C are diagrams illustrating virtual camera control.
Figure 2B:
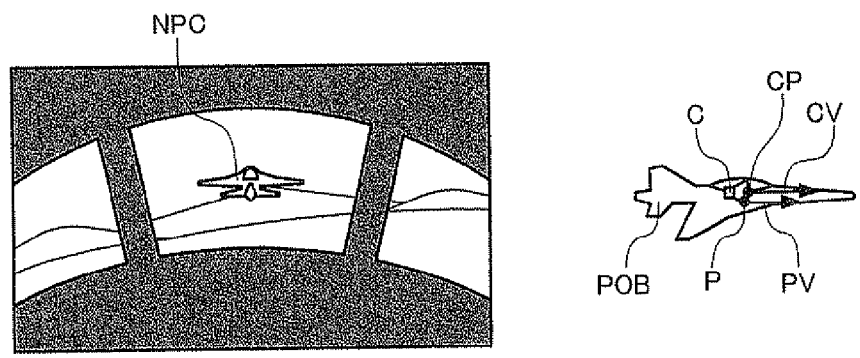
Figure 2C:
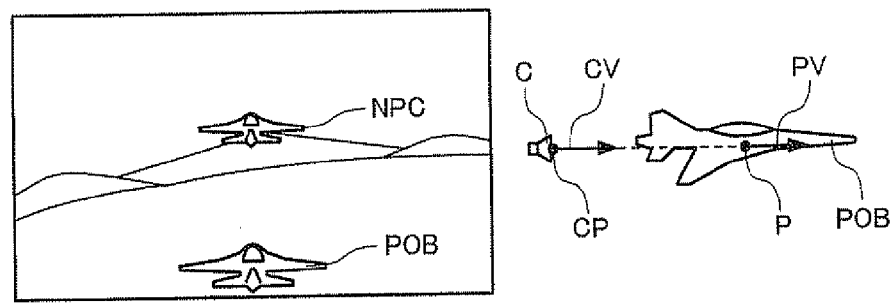

The virtual camera control section 117 controls the virtual camera so that the virtual camera follows the movement of the moving object. For example, the virtual camera control section 117 controls the virtual camera at a first person viewpoint (see FIGS. 2A and 2B) or a third-person viewpoint (rear viewpoint) (see FIG. 2C).

The virtual camera control section 117 controls the virtual camera based on movement information (e.g., position, direction, or speed) about the object obtained by the movement/motion processing section 112, for example. Specifically, the virtual camera control section 117 controls the virtual camera to maintain a predetermined relationship between the movement information about the moving object processed by the movement/motion processing section 112 and the movement information about the virtual camera in the world coordinate system. More specifically, the virtual camera control section 117 controls the virtual camera so that a predetermined relationship is maintained between the position (center point P) of the moving object processed by the movement/motion processing section 112 and the position (CP) of the virtual camera in the world coordinate system. For example, the virtual camera control section 117 controls the virtual camera so that a predetermined distance is maintained between the position (center point P) of the moving object and the position (CP) of the virtual camera. The virtual camera control section 117 controls the virtual camera so that a predetermined relationship is maintained between the moving direction and the moving speed of the virtual camera. For example, the virtual camera control section 117 controls the virtual camera so that the moving direction of the moving object is identical with the moving direction of the virtual camera, or the moving speed of the moving body is identical with the moving speed of the virtual camera. The virtual camera control section 117 controls the direction (line-of-sight direction) of the virtual camera so that a predetermined relationship is maintained between the direction of the moving object and the direction (line-of-sight direction) of the virtual camera. For example, the virtual camera control section 117 controls the virtual camera so that the direction of the moving object is identical with the direction of the virtual camera.

The virtual camera control section 117 may set the direction of the virtual camera to a predetermined direction, or may move the virtual camera along a predetermined path. In this case, the virtual camera control section 117 controls the virtual camera based on virtual camera data (virtual camera data stored in the storage section 170, the information storage medium 180, or the like) for controlling the position (moving path) or the direction of the virtual camera.

The virtual camera control section 117 may control an overhead virtual camera that photographs the object space downward from a given position.

The virtual camera control section 117 may control a replay virtual camera that is disposed in the object space and used to generate a replay image. The replay virtual camera need not necessarily follow the movement of the moving object. The replay virtual camera may be controlled based on the movement information about the moving object.

The communication control section 118 controls a process in which the terminal (e.g., first terminal (first computer)) transmits data to and receives data from another terminal (e.g., second terminal (second computer) or third terminal (third computer)) via a network.

The terminal according to this embodiment acquires network information necessary for communication control from a game server, and manages the network information. For example, the terminal acquires and manages terminal identification information (ID) assigned to each terminal (i.e., data assigned to identify each terminal that can participate in the online game), and packet destination information (e.g., IP address) that is linked to the terminal identification information.

The communication control section 118 generates a packet transmitted to another terminal (e.g., second terminal), designates the IP address or the port number of the packet destination terminal, stores data included in the received packet in the storage section 170, analyzes the received packet, and controls another packet transmission/reception process, for example.

The communication control section 118 transmits and receives data after connection between a plurality of terminals (e.g., connection between a first terminal and a second terminal) has been established until the terminals are disconnected in a predetermined cycle (e.g., 1 sec). The data transmitted between the terminals may be information input from the input section, or may be position information or movement information about an object (moving object) operated by each terminal.

The communication control section 118 analyzes a packet transmitted from another terminal (e.g., second terminal), and stores data (e.g., information about the position of an object operated by the other terminal) included in the received packet in the storage section.

When the network system includes a plurality of terminals, a peer-to-peer (P2P) system may be used so that an online game is implemented while transmitting data between the terminals, or another system in which data is transmitted between the terminals and a server that provides a specific service may be used, for example. A client-server system may also be employed so that an online game is implemented while transmitting data (information) between the terminals via a server. The network system according to this embodiment may utilize wireless communication instead of cable communication.

The drawing section 120 performs a drawing process based on the results for various processes performed by the processing section 100 to generate an image, and outputs the generated image to the display section 190. Specifically, the drawing section 120 generates an image viewed from the virtual camera in the object space (within the object space).

For example, the drawing section 120 receives object data (model data) including vertex data (e.g., vertex position coordinates, texture coordinates, color data, normal vector, or alpha-value) of each vertex of the object (model), and performs a vertex process (shading using a vertex shader) based on the vertex data included in the received object data. When performing the vertex process, the drawing section 120 may perform a vertex generation process (tessellation, surface division, or polygon division) for subdividing the polygon.

In the vertex process, the drawing section 120 performs a vertex movement process and a geometric process such as coordinate transformation (world coordinate transformation or camera coordinate transformation), clipping, or perspective transformation based on a vertex processing program (vertex shader program or first shader program), and changes (updates or adjusts) the vertex data of each vertex that forms the object based on the processing results.

The drawing section 120 then performs a rasterization process (scan conversion) based on the vertex data obtained by the vertex process, so that the surface of the polygon (primitive) is linked to pixels. The drawing section 130 then performs a pixel process (shading using a pixel shader or a fragment process) that draws the pixels that form the image (fragments that form the display screen). In the pixel process, the drawing section 120 determines the drawing color of each pixel that forms the image by performing various processes such as a texture reading (texture mapping) process, a color data setting/change process, a translucent blending process, and an anti-aliasing process based on a pixel processing program (pixel shader program or second shader program), and outputs (draws) the drawing color of the object subjected to perspective transformation to the image buffer 172 (i.e., a buffer that can store image information corresponding to each pixel; VRAM, rendering target, or frame buffer). Specifically, the pixel process includes a per-pixel process that sets or changes the image information (e.g., color, normal, luminance, and alpha value) corresponding to each pixel. The drawing section 120 thus generates an image viewed from the virtual camera (given viewpoint) in the object space.

The vertex process and the pixel process are implemented by hardware that enables a programmable polygon (primitive) drawing process (i.e., a programmable shader (vertex shader and pixel shader)) based on a shader program written in shading language. The programmable shader enables a programmable per-vertex process and a per-pixel process to increase the degree of freedom of the drawing process so that the representation capability can be significantly improved as compared with a fixed drawing process using hardware.

The drawing section 120 performs a geometric process, texture mapping, hidden surface removal, alpha-blending, and the like when drawing the object.

In the geometric process, the drawing section 120 subjects the object to coordinate transformation, clipping, perspective projection transformation, light source calculation, and the like. The object data (e.g. object's vertex position coordinates, texture coordinates, color data (luminance data), normal vector, or alpha-value) after the geometric processing (after perspective transformation) is stored in the storage section 170.

The term "texture mapping" refers to a process that maps a texture (texel value) stored in the storage section 170 onto the object. Specifically, the drawing section 120 reads a texture (surface properties such as color (RGB) and alpha value) from the storage section 170 using the texture coordinates set (assigned) to the vertices of the object and the like. The drawing section 120 then maps the texture (two-dimensional image) onto the object. In this case, the drawing section 120 performs a pixel-texel association process, a bilinear interpolation process (texel interpolation process), and the like.

The drawing section 120 may perform a hidden surface removal process by a Z-buffer method (depth comparison method or Z-test) using a Z-buffer (depth buffer) that stores the Z-value (depth information) of the drawing pixel. Specifically, the drawing section 120 refers to the Z-value stored in the Z-buffer when drawing the drawing pixel corresponding to the primitive of the object. The drawing section 120 compares the Z-value stored in the Z-buffer with the Z-value of the drawing pixel of the primitive. When the Z-value of the drawing pixel is the Z-value in front of the virtual camera (e.g., a small Z-value), the drawing section 120 draws the drawing pixel and updates the Z-value stored in the Z-buffer with a new Z-value.

The term "alpha-blending" refers to a translucent blending process (e.g., normal alpha-blending, additive alpha-blending, or subtractive alpha-blending) based on the alpha-value (A value).

For example, a drawing color C1 (overwriting color) that is to be drawn in the image buffer 172 and a drawing color C2 (base color) that has been drawn in the image buffer 172 (rendering target) are linearly blended based on the alpha-value. Specifically, the final drawing color C is calculated by "$C=C1*alpha+C2*(1-alpha)$".

Note that the alpha-value is information that can be stored corresponding to each pixel (texel or dot), such as additional information other than the color information. The alpha-value may be used as mask information, translucency (equivalent to transparency or opacity), bump information, or the like.

When the terminal transmits data to and receives data from another terminal (second terminal) via a network to implement a multi-player online game, the drawing section 120 generates an image viewed from the virtual camera that follows the movement of the object operated by the terminal (first terminal) (virtual camera controlled by the terminal (first terminal)). Specifically, each terminal independently performs the drawing process.

The drawing section 120 generates a radar map image and a game image displayed within the screen. For example, the game image generation section 121 generates an image viewed from the virtual camera in the object space as the game image.

Figure 3A:
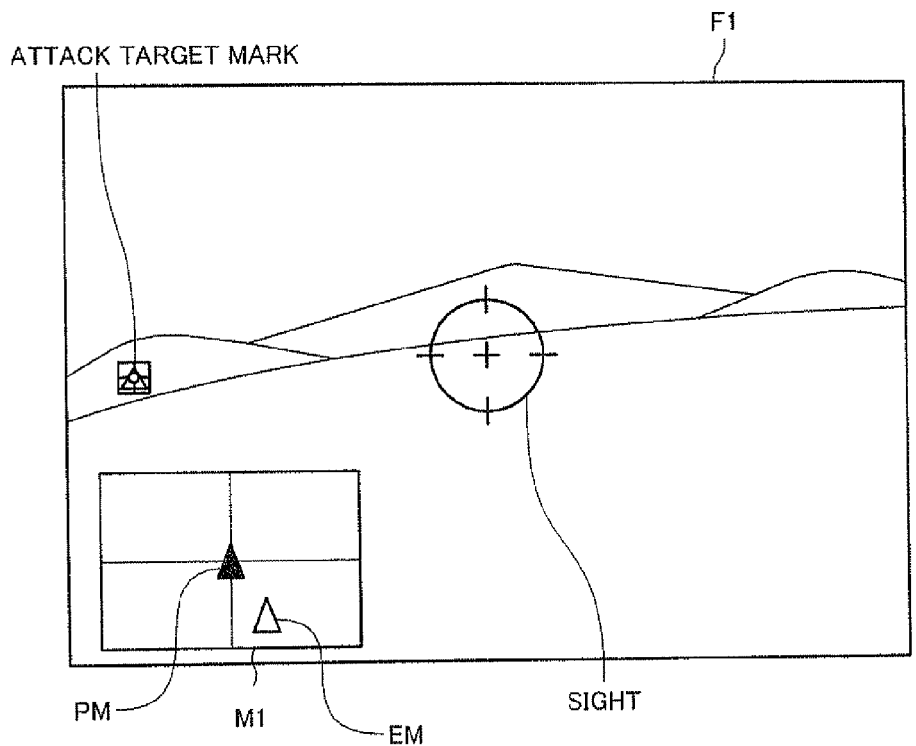
FIG. 3A illustrates an example of a game image and a radar map image.

The game image generation section 121 generates a HUD image that imitates a head-up display (HUD) in the real world and indicates movement information about the player object and the enemy object, blends an image viewed from the virtual camera in the object space (within the object space) with the HUD image, and displays the resulting image on the display section. In this embodiment, a HUD object is disposed within the screen to generate a HUD image. As illustrated in FIG. 3A, an attack target mark that indicates the position of the enemy object or the like may be drawn as the HUD object. Note that term "head-up display (HUD)" refers to a display that directly displays information (i.e., information is projected onto a transparent colorless screen (e.g., windshield)).

The radar map image generation section 122 generates an image that indicates the position of an object present within the radar map range as a radar map image. Note that the radar map image generation section 122 may generate the radar map image as part of the HUD image. For example, the radar map image generation section 122 may generate an image that includes a mark that indicates the position of each object, and masks the mark that indicates the position of each non-display target object (e.g., object present within the search range) to generate the radar map image.

For example, the radar map image generation section 122 may generate a radar map image that indicates the position of the player object and the position of the enemy object present within the search range. The radar map image generation section 122 may generate a radar map image that indicates the position of the enemy object present within an ally search range (extent, scope, volume).

The radar map image generation section 122 may generate a radar map image that does not indicate the position of the enemy object present within the search range when a special state of the enemy object is enabled. The radar map image generation section 122 may enable the special state of a first enemy object for which the special state is disabled when the first enemy object is present within a special range (extent, scope, volume) that is set based on the position of a second enemy object for which the special state is enabled.

The radar map image generation section 122 may disable the special state of the enemy object for which the special state is enabled when the enemy object is present within an approach range (extent, scope, volume). Specifically, the radar map image generation section 122 generates a radar map image that indicates the position of the enemy object when the enemy object is present within the approach range irrespective of whether or not the special state of the enemy object is enabled.

The radar map image generation section 122 may generate a radar map image that indicates the position of each object operated by each terminal belonging to the ally group (e.g., first group), and the position of the enemy object (object belonging to the enemy group) that is present within the search range of at least one object belonging to the ally group.

The sound generation section 130 performs a sound generation process based on the results of various processes performed by the processing section 100 to generate game sound such as background music (BGM), effect sound, or voice, and outputs the generated game sound to the sound output section 192.

The terminal according to this embodiment may be used in a single-player mode that allows only one player to play the game, or may be used in a multi-player mode that allows a plurality of players to play the game. When the terminal is used in the multi-player mode, the terminal may transmit data to and receive data from another terminal via a network to perform the game process, or may perform the game process based on information input from a plurality of input sections.

2. Outline

This embodiment relates to an image generation process for a shooting game. For example, this embodiment relates to a flight shooting game in which a player object operated by the player and an enemy object (i.e., a computer object or an object operated by another player) attack each other using a missile, a machine gun, and the like.

In this embodiment, the player object and the enemy object aim at each other as a target object (target), and fire a missile or a machine gun at the target object. Therefore, the player who operates the player object performs an attack operation that fires a missile or a machine gun at the enemy object, and moves the player object to evade an attack (e.g., missile) by the enemy object.

As illustrated in FIG. 3A, an image viewed from a virtual camera C that follow the movement of a player object POB is generated and displayed as a game image F1, and a radar map image M1 is generated to be displayed in some area (radar map display area) of the screen. For example, the radar map image M1 is generated using a mark PM (display object) corresponding to the player object POB as a position P of the player object POB within the radar map range in the object space (within the object space) illustrated in FIG. 3B.

A mark EM that indicates a position E of an enemy object EOB may be displayed in the radar map, as illustrated in FIG. 3A. However, if the mark EM of the enemy object is unconditionally displayed in the radar map image, the player can easily determine the positional relationship between the enemy object and the player object by observing the radar map image, so that the player cannot enjoy searching for the enemy object.

Therefore, an enemy search range (synonymous with a search range) is set for the player object, and an enemy object present within the enemy search range is displayed in the radar map image. This makes it possible for the player to play the game with the aim to search for an enemy.

In this embodiment, an ally group (player's team, first group, or first team) that consists of the player object and an ally object and an enemy group (enemy team, second group, or second team) that consists of a plurality of enemy objects can attack each other.

In this case, the enemy search range is set for each object (player object and ally object) that belongs to the ally group, and the ally group shares information about the enemy object present within the enemy search range. This makes it possible for friends to share enemy search information, so that a radar map image that implements novel game play can be provided.

3. Radar Map Image 3-1. Radar Map Range

Figure 3B:
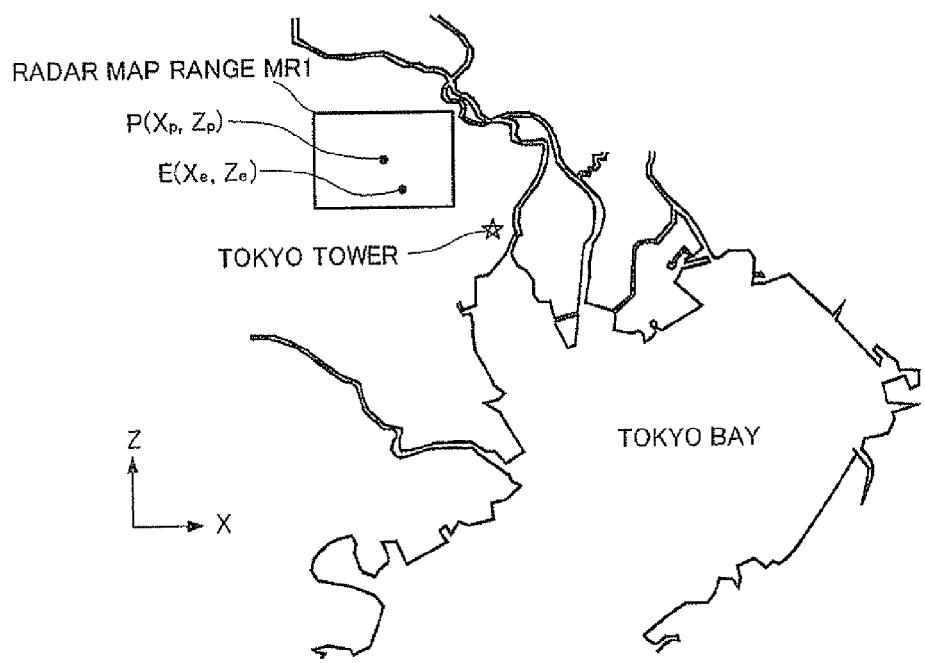
FIG. 3B illustrates a map range.
Figure 4A:
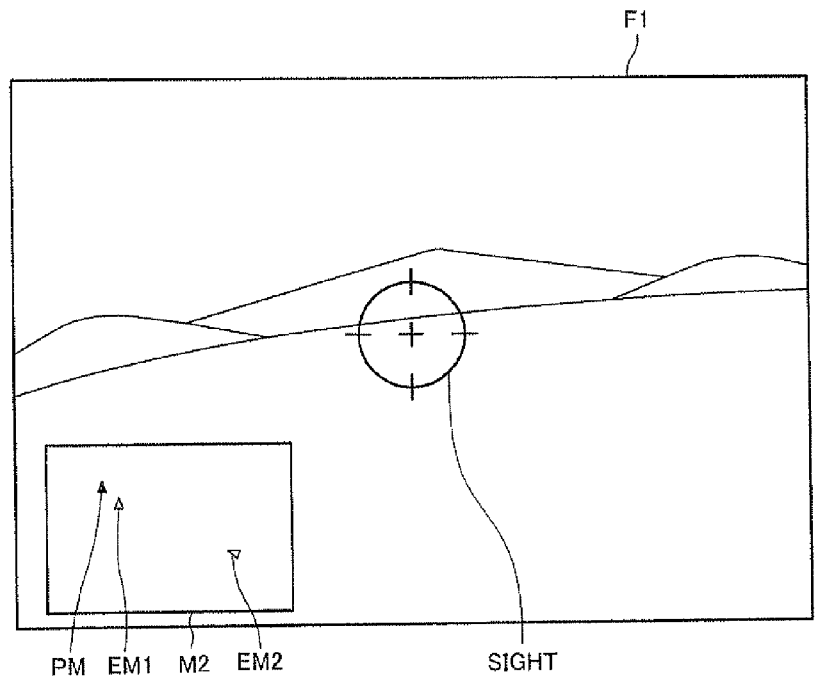
FIG. 4A illustrates an example of a game image and a radar map image.
Figure 4B:
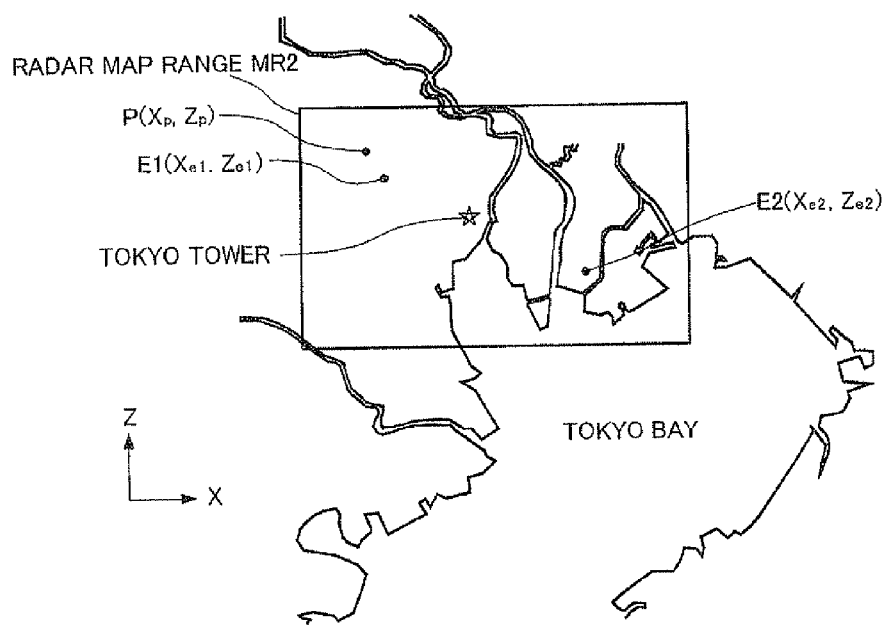
FIG. 4B illustrates a map range.

In this embodiment, a radar map range is set in the object space, and a radar map image that indicates the position of the object within the radar map range is generated. As illustrated in FIGS. 3A and 3B, the radar map range MR1 may be set based on the position P of the player object POB in the object space. As illustrated in FIGS. 4A and 4B, a radar map range MR2 may be set so that the positional relationship between the objects in a wide range can be observed.

In the example illustrated in FIGS. 3A and 3B, a predetermined volume that encloses the position P of the player object POB is set as the radar map range MR1. For example, a volume having a length of 50 km, a width of 100 km, and an unlimited height may be set as the radar map range MR1. In the example illustrated in FIGS. 4A and 4B, a battle airspace (object movable range) is set as the radar map range MR2.

The radar map range MR1 or the radar map range MR2 may be selected based on information input from the input section, and the selected radar map range may be set. Note that the size of the radar map range may be changed based on information input from the input section.

3-2. Enemy Search Range

The enemy search range according to this embodiment is described below. In this embodiment, the enemy search range (extent, scope, volume) is set for each object present in the object space. The enemy search range is set based on the position of the object. The enemy search range includes the object, and is narrower than the radar map range. The enemy search range is set for each object, base, and tank belonging to an ally group G1, and each enemy object, base, and tank belonging to an ally group G2.

Figure 5:
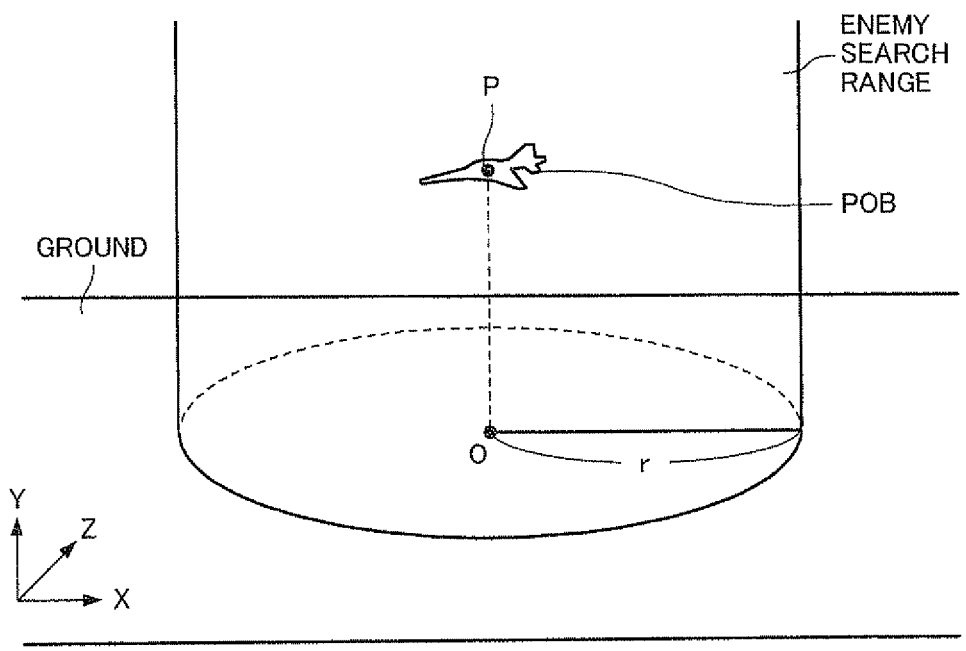
FIG. 5 is a diagram illustrating an enemy search range (search range).

As illustrated in FIG. 5, a column that is formed around the position P of the player object POB and has a radius r (e.g., 5 km) is set as the enemy search range of the player object POB, for example. Note that the height of the column is infinite. In this case, since the player need not take account of the difference in altitude, the player can easily search for an enemy.

The size of the enemy search range including the object is set based on the type of the object. As illustrated in FIG. 6, the radius of the column set as the enemy search range is set depending on the type of the object, for example. In the example illustrated in FIG. 6, a column having a radius of 7 km is set as the enemy search range when the object is a large fighter aircraft, and a column having a radius of 6 km is set as the enemy search range when the object is a practical fighter aircraft. Therefore, the player can be aware of the presence of the enemy object earlier than another player when the enemy search range of the player object is larger than the enemy search range of the enemy object.

Note that the enemy search range set for each object may be a sphere that is formed around the position of the object and has a radius r. The enemy search range is not limited to a column or a sphere, but may be various volumes (e.g., prism or cube) formed around the position of the object.

The enemy search range may be a volume that includes the object and at least part of the periphery of the object. Specifically, at least one of the upper range, the lower range, the front range, the rear range, the left range, and the right range of the object may be set as the enemy search range.

3-3. Generation of Radar Map Image 3-3-1. When Enemy Object is Present within Enemy Search Range of Player Object In this embodiment, a radar map image that indicates the position of the enemy object present within the enemy search range of the player object set in the object space is generated. Specifically, even if the enemy object is present within the radar map range, the enemy object is not displayed on the radar map when the enemy object is not present within the enemy search range. This makes it possible to implement more interesting game play that aims to search for the enemy object in addition to merely attacking the enemy object and defending against attack by the enemy object.

Figure 7A:
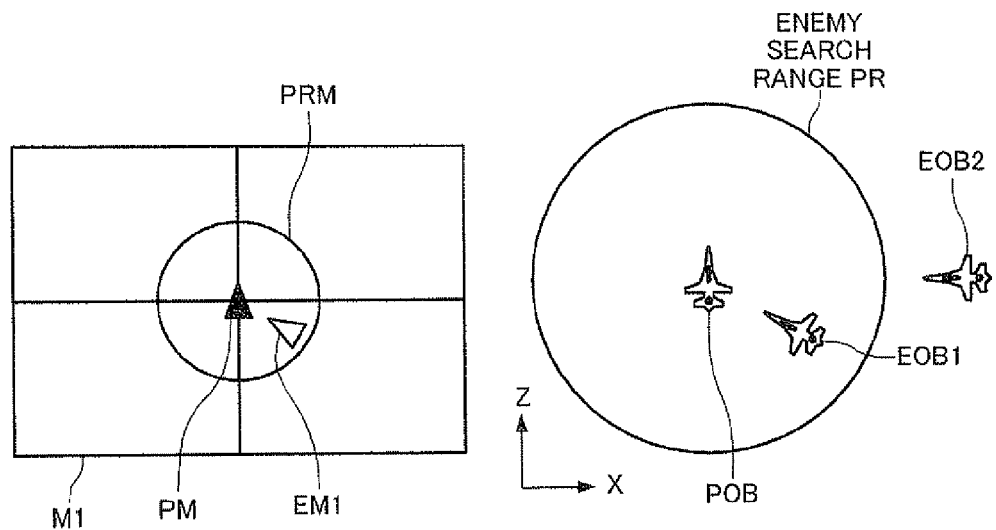
FIGS. 7A and 7B are diagrams illustrating a radar map image.

As illustrated in FIG. 7A, when an enemy object EOB1 is present within an enemy search range PR of the player object POB within the radar map range, for example, the radar map image M1 that indicates the position of the enemy object EOB1 using an enemy object mark EM1 corresponding to the enemy object EOB1 is generated. On the other hand, since an enemy object EOB2 is not present within the enemy search range PR, the radar map image does not indicate the position of the enemy object EOB2 (i.e., a mark of the enemy object EOB2 is not displayed).

Figure 7B:
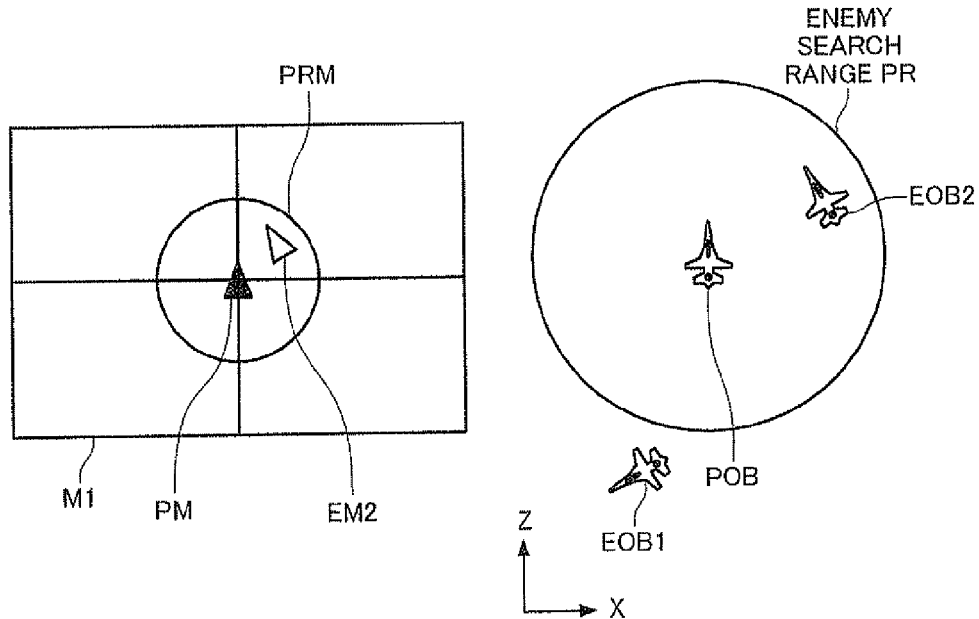

When several frames have elapsed from the state illustrated in FIG. 7A, and each object has moved as illustrated in FIG. 7B, a radar map image that does not indicate the position of the enemy object EOB1 (i.e., the enemy object mark EM1 is not displayed) is generated since the enemy object EOB1 is not present within the enemy search range PR of the player object POB. Specifically, when the enemy object EOB1 is not present within the enemy search range PR of the player object POB, the radar map image M1 that does not indicate the enemy object mark EM1 is generated even if the enemy object EOB1 is present within the radar map range. When the enemy object EOB2 has entered the enemy search range PR, the radar map image M1 that indicates the position of the enemy object EOB2 (i.e., an enemy object mark EM2 is displayed) is generated.

Note that the radar map image that indicates the enemy search range PR is generated using a two-dimensional enemy search range mark PRM corresponding to the enemy search range PR of the player object in the object space.

According to this embodiment, since the player must search for the position of the enemy object as a result of displaying the enemy object that is present within the enemy search range set for the player object POB, a game that prompts the player to search for the enemy object is implemented.

3-3-2. When Enemy Object is Present within Enemy Search Range of Ally Object

In this embodiment, the enemy object present within the enemy search range of the ally object is also displayed in the radar map image in addition to the enemy object present within the enemy search range of the player object set in the object space. This makes it possible for the player to easily find the enemy object in cooperation with the ally object, and implement a game that prompts the players to unite which achieves a more interesting enemy search process.

Figure 8:
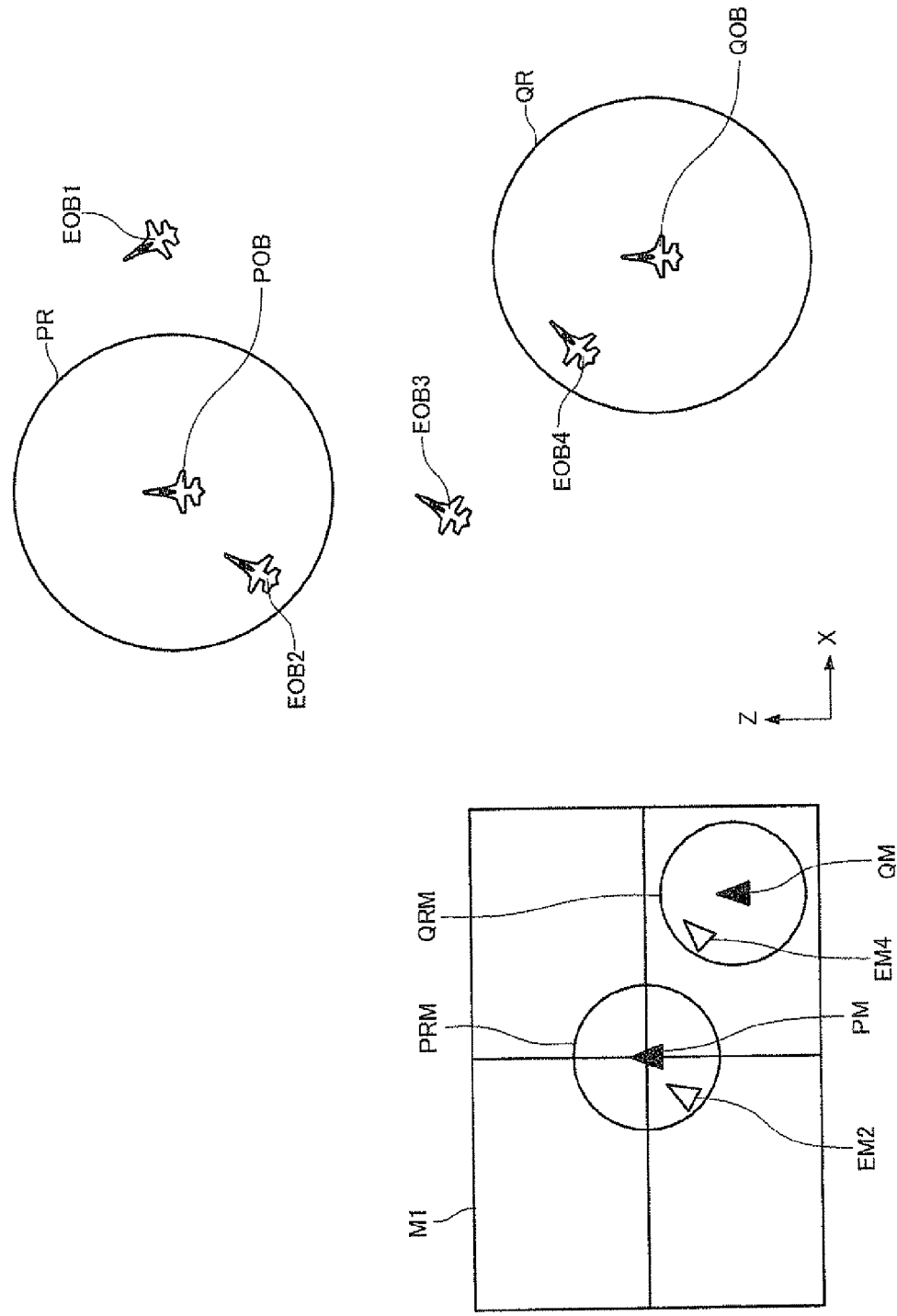
FIG. 8 is a diagram illustrating a radar map image.

As illustrated in FIG. 8, when the player object POB and an ally object QOB are present within the radar map range, the radar map image is generated so that the radar map image indicates the position of the player object POB and the position of the ally object QOB using the player object mark PM corresponding to the player object POB and an ally object mark QM corresponding to the ally object QOB, and also indicates the position of an enemy object among enemy objects EOB1, EOB2, EOB3, and EOB4 that is present within the radar map range and is present within at least one of the enemy search range PR of the player object POB and an enemy search range QR of the ally object QOB. Specifically, the radar map image is generated so that the radar map image does not indicate the position of an enemy object among the enemy objects EOB1, EOB2, EOB3, and EOB4 that is present within the radar map range but is not present within the enemy search range PR of the player object POB and the enemy search range QR of the ally object QOB.

In the example illustrated in FIG. 8, since the enemy object EOB2 is present within the enemy search range PR of the player object POB, and the enemy object EOB4 is present within the enemy search range QR of the ally object, the radar map image M1 that indicates an enemy object mark EM2 corresponding to the enemy object EOB2 and an enemy object mark EM4 corresponding to the enemy object EOB4 is generated.

The radar map image M1 is generated so that the radar map image M1 does not indicate the position of the enemy objects EOB1 and EOB3 that are not present within the enemy search range PR of the player object POB and the enemy search range QR of the ally object QOB. Specifically, since the enemy objects EOB1 and EOB3 are present within the radar map range, but are not present within the enemy search range PR of the player object POB and the enemy search range QR of the ally object QOB, the radar map image M1 is generated so that enemy object marks EM1 and EM3 are not displayed.

Note that the radar map image that indicates the enemy search range QR is generated using a two-dimensional enemy search range mark QRM corresponding to the enemy search range QR of the ally object QOB in the object space.

According to this embodiment, the player can determine the positions of a plurality of enemy objects in cooperation with the ally object. When the ally object is an object operated using another terminal GT2 (game device), the player who uses the terminal GT2 can determine the positions of a plurality of enemy objects in cooperation with the player who uses a terminal GT1 that operates the player object. Specifically, game play that promotes cooperation within the ally group can be provided.

3-3-3. Relationship Between Container Range and Enemy Search Range

Figure 9A:
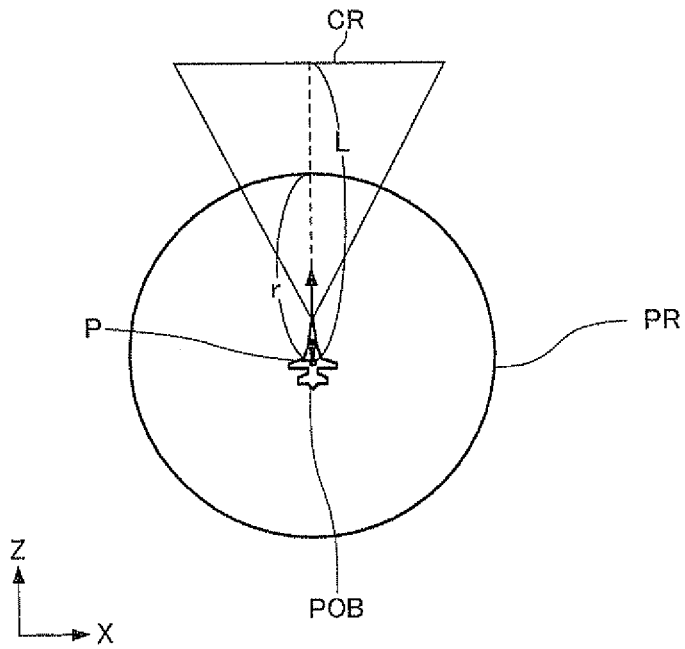
FIGS. 9A and 9B are diagrams illustrating the relationship between a container range and an enemy search range.

As illustrated in FIG. 9A, a container range CR (triangular prism) is set in the object space around the position P of the player object POB. The container range is set to indicate the enemy object EOB as the attack target. When the enemy object EOB is present within the container range CR, an attack target mark is displayed within the game image F1 (see FIG. 3A). Specifically, the container range is used to display the attack target mark within the game image F1. For example, the container range may be a triangular prism that has a length L of the object in the axial direction in the XZ plane as the height (the height of the triangle having a base with a predetermined distance is unlimited).

The length r of the enemy search range in the axial direction (i.e., the radius r of the column) is smaller than the length L of the container range in the axial direction. Specifically, if the length r of the enemy search range set for the player object POB is equal to or larger than the length L of the container range in the axial direction, the player can easily find the enemy since the enemy search range PR is large.

Figure 9B:
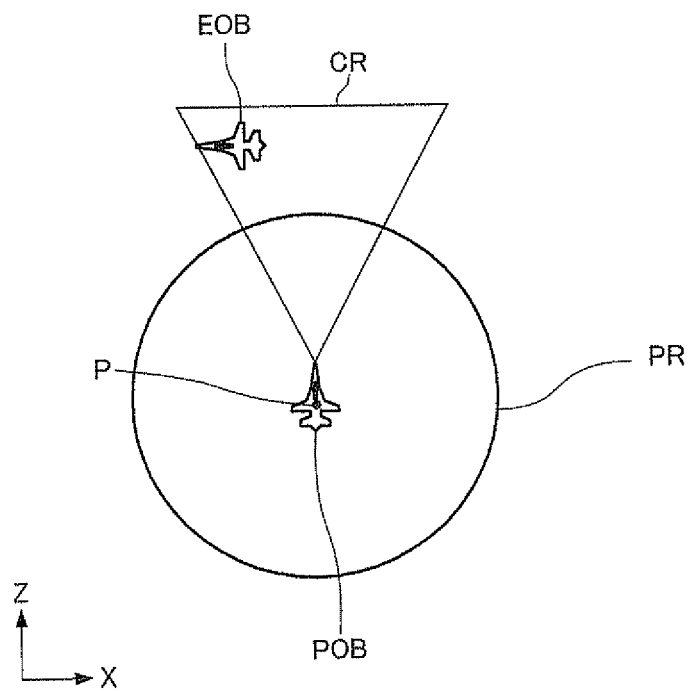

Specifically, when the enemy object EOB is present within the container range CR of the player object POB, and is not present within the enemy search range PR of the player object POB (see FIG. 9B), the position of the enemy object cannot be observed on the radar map image M1 even if the attack target mark is displayed within the game image F1.

Note that the length L of the container range in the axial direction may be set to be equal to the length r of the enemy search range PR in the axial direction so that an unskilled player (e.g., beginner) can enjoy the game. Specifically, the enemy search range PR may be set based on the length of the container range in the axial direction.

3-3-4. When Enemy Object is in Stealth State

In this embodiment, when an enemy object for which a stealth state (i.e., special state) is enabled (success) is present within at least one of the enemy search range PR of the player object POB and the enemy search range QR of the ally object, the radar map image is generated so that the position of the enemy object is not displayed (i.e., an enemy object mark is not displayed). The term "stealth state" refers to a state that makes it difficult to search for (find) the object. If the object in a stealth state is present, a more interesting game can be implemented.

As illustrated in FIG. 6, a stealth state flag (special state flag) is set to 0 or 1 (true or false) depending on the type of object. The stealth state of an object for which the stealth state flag is set to 1 is enabled, and the stealth state of an object for which the stealth state flag is set to 0 is disabled, for example. Specifically, an object for which the stealth state flag is set to 0 is not set to a stealth state.

When an object (e.g., enemy object EOB2) for which the stealth state flag is set to 1 is present within an approach range SR of the opposing object, the stealth state of the object is disabled, and a radar map image that indicates the position of the object is generated.

The term "approach range SR" refers to a range that is set based on the position of the object and includes the object. The approach range SR is a volume set inside the enemy search range. For example, the approach range SR of the player object POB may be a column that is set around the position P of the player object POB and has a radius rs (rs<r). Specifically, since an object in a stealth state can be normally found when the object is present within the approach range SR (i.e., the object is present close to the player object), the radar map image is generated so that an object for which the stealth state is enabled can be observed on the radar map when the object is present within the approach range SR.

Note that the stealth state of an object for which the stealth state flag is set to 1 may be enabled when the object satisfies a stealth enable condition (stealth success condition).

For example, an object for which the stealth state flag is set to 1 satisfies the stealth enable condition (i.e., the stealth state is enabled) when the object (1) does not lock on the opposing object, (2) is not present within the approach range SR of the opposing object, and (3) is not present within the enemy search range and the container range of the opposing object.

Figure 10:
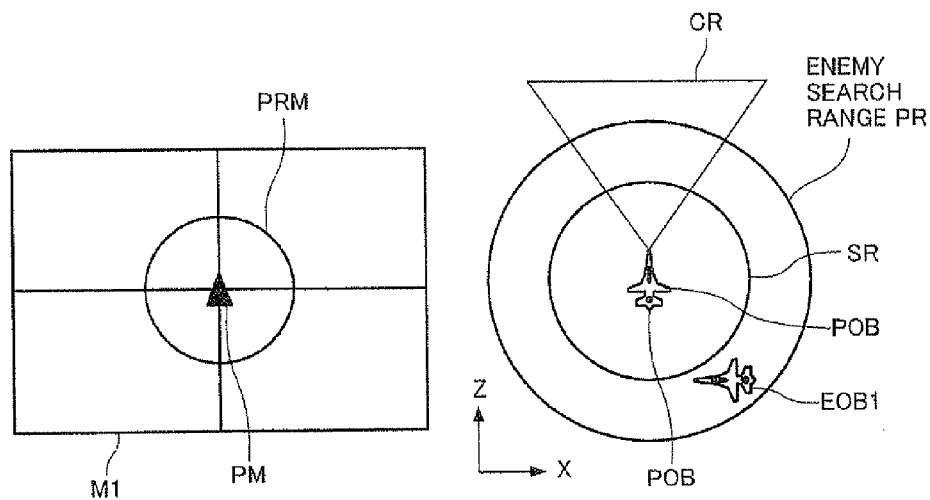
FIG. 10 is a diagram illustrating an example of a radar map image when a stealth state is enabled.

As illustrated in FIG. 10, the enemy object EOB1 (stealth plane) for which the stealth state flag is set to 1 satisfies the stealth enable condition (i.e., the stealth state is enabled) since the enemy object EOB1 does not lock on the player object POB, is not present within the approach range SR of the player object POB, and is not present within the enemy search range PR and the container range CR of the player object POB. Therefore, the position of the enemy object EOB1 is not displayed on the radar map image M1.

Figure 11:
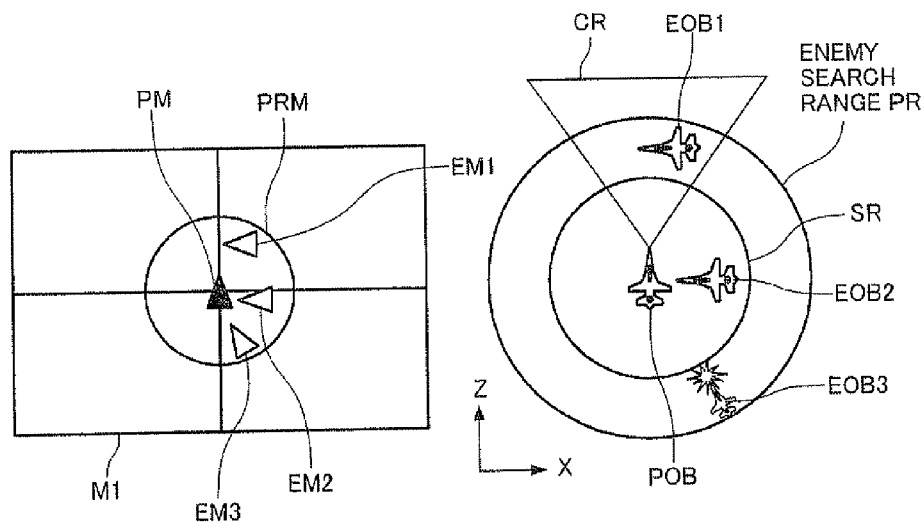
FIG. 11 is a diagram illustrating an example of a radar map image when a stealth state is disabled.

As illustrated in FIG. 11, since the enemy objects EOB1, EOB2, and EOB3 (stealth planes) for which the stealth state flag is set to 1 do not satisfy the stealth enable condition, the positions of the enemy objects EOB1, EOB2, and EOB3 are displayed on the radar map image M1.

Specifically, the stealth state of the enemy object EOB1 is disabled since the enemy object EOB1 is present within the container range CR of the player object POW. The stealth state of the enemy object EOB2 is disabled since the enemy object EOB2 is present within the approach range SR of the player object POB. The stealth state of the enemy object EOB3 is disabled since the enemy object EOB3 locks on the player object POB.

When the enemy object is an object operated by another terminal connected via a network, and the object operated by the terminal GT1 that operates the player object is a stealth plane, the object may not displayed on the radar map image of a terminal GT3 when the stealth state is enabled. A more interesting game can be implemented by utilizing an object for which the stealth state is enabled.

3-3-5. When Jamming Range (Special Range) is Set for Enemy Object

Figure 12:
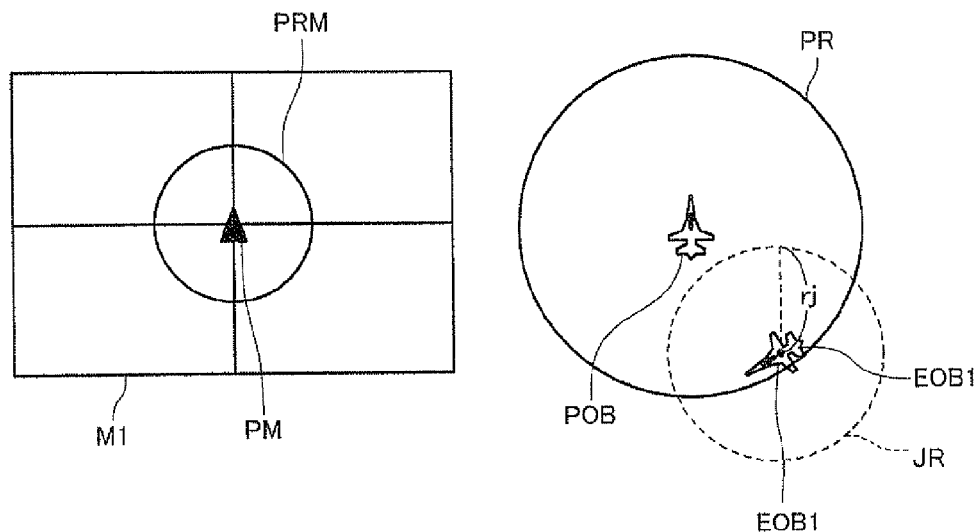
FIG. 12 is a diagram illustrating an example of a radar map image when a jamming function is enabled.

As illustrated in FIG. 12, when the enemy object EOB1 for which a jamming function (i.e., special state) is enabled is present within at least one of the enemy search range PR of the player object POB and the enemy search range QR of the ally object QOB, the radar map image is generated so that the position of the enemy object EOB1 is not displayed.

Figure 13:
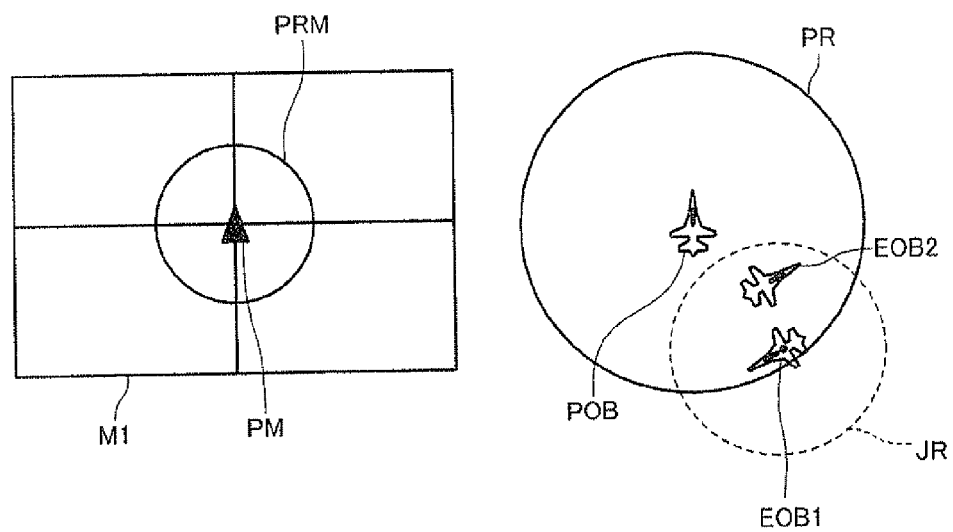
FIG. 13 is a diagram illustrating an example of a radar map image relating to a jamming range.

As illustrated in FIG. 13, when the enemy object EOB2 is present within a jamming range JR (special range) of the enemy object EOB1 for which a jamming function is enabled, the radar map image is generated so that the position of the enemy object EOB2 is not displayed. The term "jamming function" refers to a function that makes it difficult to search for (find) the object by causing virtual interference with the opposing object.

As illustrated in FIG. 14, a jamming function flag of each object is set to 0 or 1 (true or false). For example, the jamming function of an object for which the jamming function flag is set to 1 is enabled. The jamming function of an object for which the jamming function flag is set to 0 is disabled.

The jamming range JR is a column that is set around the position of the object and has a radius rj. For example, the jamming range JR may be set to differ depending on the object. As illustrated in FIG. 14, the jamming range JR of the enemy object EOB1 for which the jamming function flag is set to 1 is a column that is set around the position Q of the enemy object EOB1 in the XZ plane and has a radius rj=3 and an unlimited height.

Figure 15:
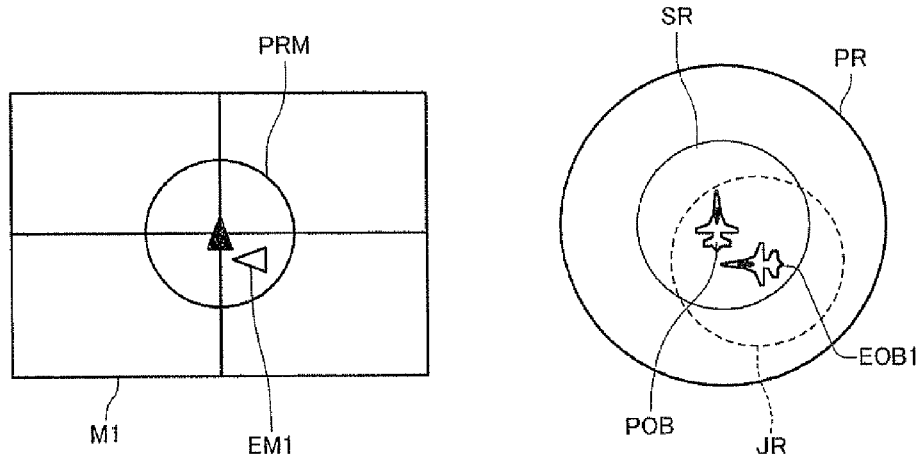
FIG. 15 is a diagram illustrating an example of a radar map image relating to a jamming range.

As illustrated in FIG. 15, when the enemy object EOB1 for which the jamming function is enabled is present within the approach range SR of the player object POB, the jamming function of the enemy object EOB1 is disabled, and the radar map image is generated so that the position of the enemy object EOB1 is displayed. When the enemy object EOB2 that is present within the jamming range is present within the approach range SR of the player object POB, the radar map image is generated so that the position of the enemy object EOB2 is displayed. This is because an object that approaches the player object POB is normally observed.

3-3-6. Example of Generation of Radar Map Image

In this embodiment, the radar map image is generated using a masking process so that the position of a non-display target object is not displayed.

Figure 16:
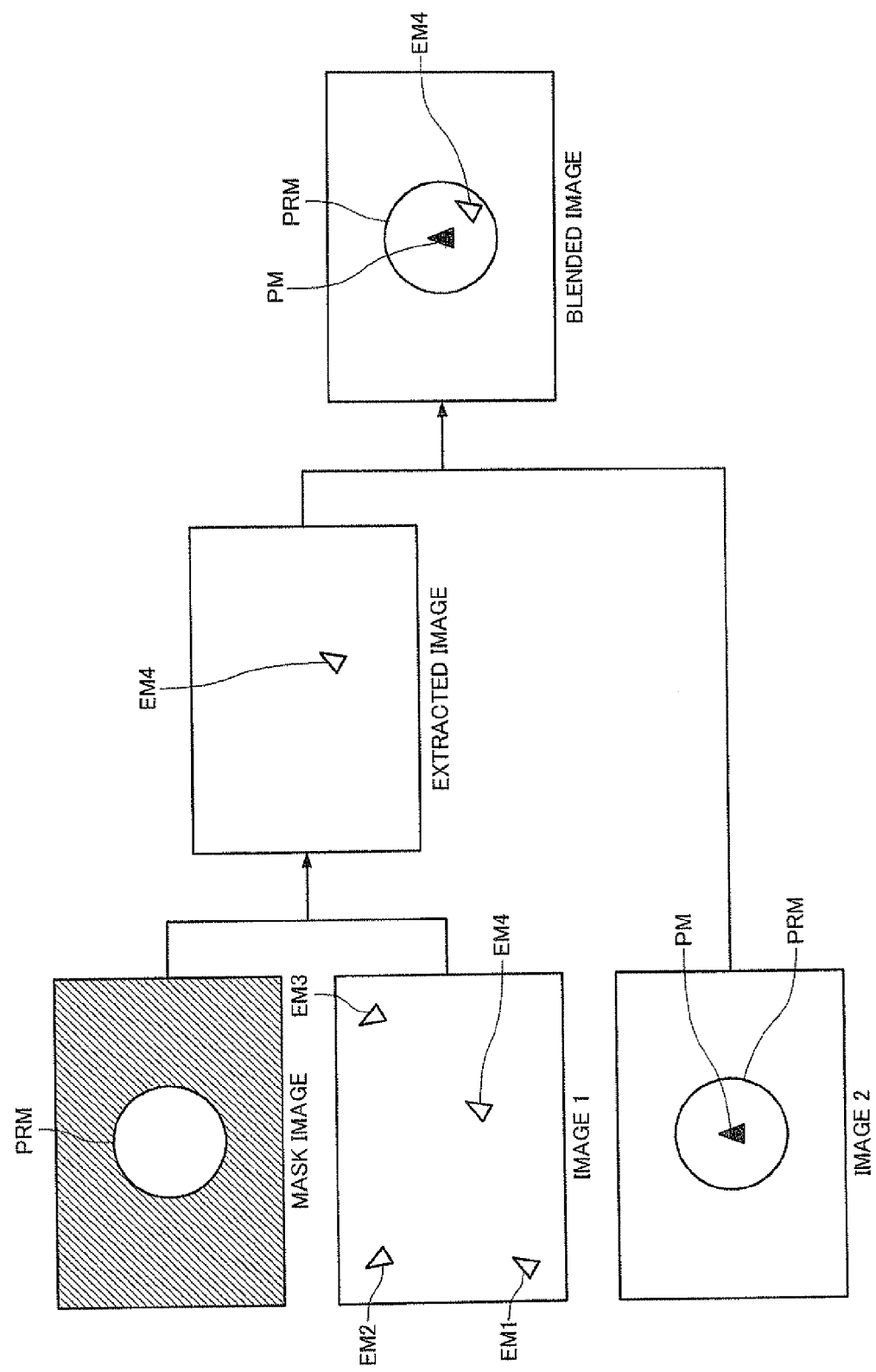
FIG. 16 is a diagram illustrating a radar map image generation method.

As illustrated in FIG. 16, an enemy search area PRM on the radar map corresponding to the enemy search range PR within the radar map range is set, and a mask image is generated so that the enemy search area PRM is indicated in black (0) and an area other than the enemy search area PRM is indicated in white (1).

The marks of the enemy objects (objects belonging to the enemy group) present within the radar map range are disposed on the radar map to generate an image 1. The marks of the player object and the ally object (objects belonging to the ally group) present within the radar map range are disposed on the radar map to generate an image 2. The white (1) pixels of the mask image are extracted from the image 1 to generate an extracted image. The extracted image and the image 2 are blended to generate a blended image. The above masking process makes it possible to efficiently set the non-display target mark to a non-display state.

In this embodiment, each mark is disposed so that the position (X, Z) of each object in the object space corresponds to the position coordinates (x, y) of the radar map image, and the axial direction of the object corresponds to the protruding direction of the mark.

When setting the enemy object (object belonging to the enemy group) in the special state to a non-display state, the mask image is generated so that the mark of the enemy object is indicated in black. When setting the enemy object within the jamming range to a non-display state, the mask image is generated so that an area corresponding to the jamming range is indicated in black. Since the enemy object present within the approach range is displayed on the radar map, the mask image is generated so that an area corresponding to the approach range is indicated in white. The above masking process makes it possible to easily set the enemy object mark to a display state or a non-display state.

4. Communication Control

4-1. Outline

In this embodiment, one terminal transmits data to and receives data from a plurality of the other terminals via a network to implement an online flight shooting game.

Figure 17:
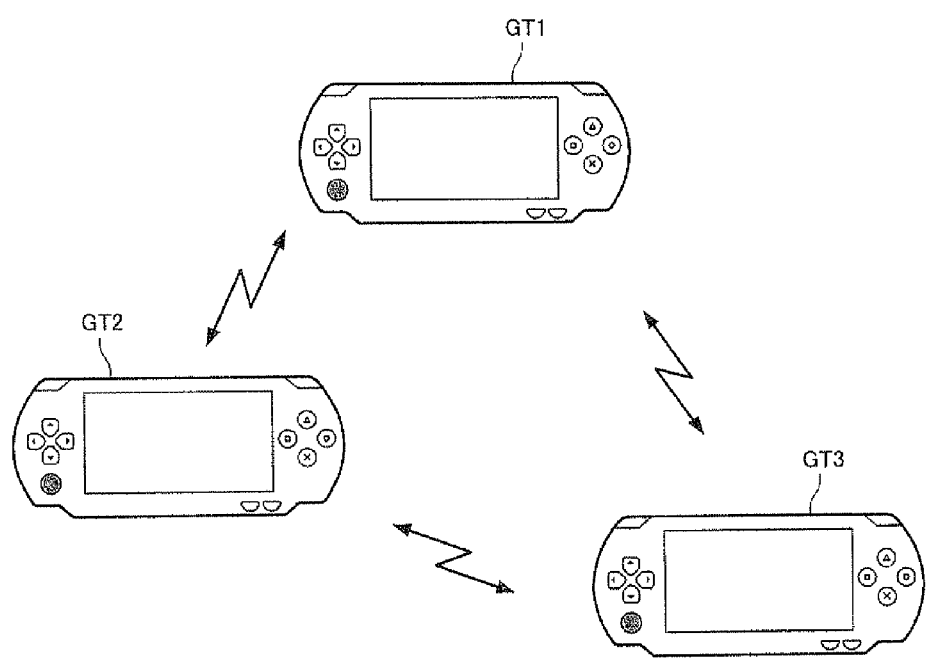
FIG. 17 is a diagram illustrating a network system.
Figure 18:
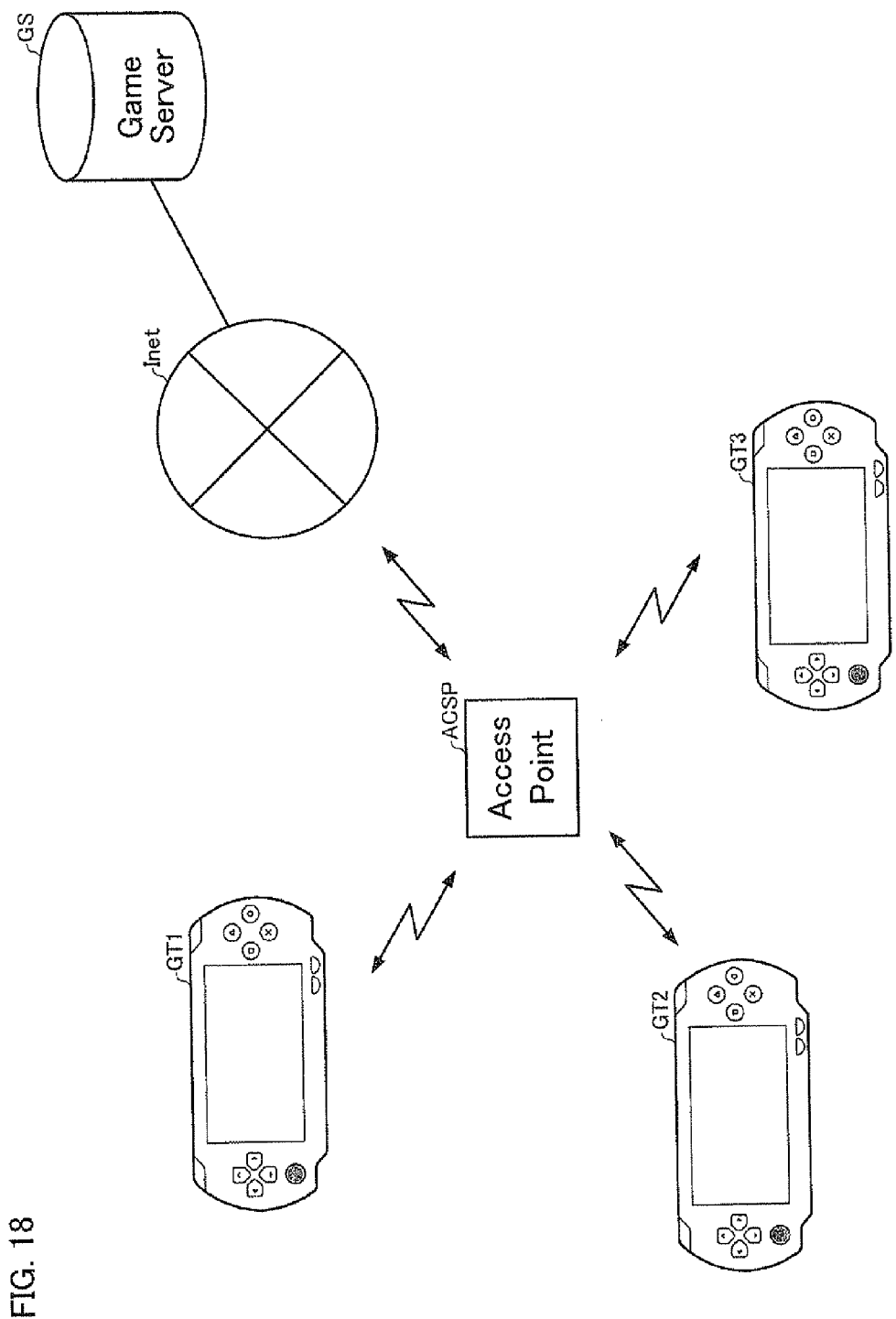
FIG. 18 is a diagram illustrating a network system.

FIGS. 17 and 18 are diagrams illustrating the configuration of a network system according to this embodiment. For example, the players who respectively use a plurality of terminals GT1 to GT3 can enjoy match play or cooperative play via wireless communication between the terminals GT1 to GT3. Note that the terminals GT1 to GT3 communicate via cable communication.

The wireless communication mode includes an ad hoc mode in which the terminals GT1 to GT3 construct a network in an autonomous decentralized way and packets including game information and the like are directly transmitted between the terminals (see FIG. 17), and an infrastructure mode in which packets including game information and the like are transmitted between the terminals GT1 to GT3 via an access point ACSP (see FIG. 18). In the infrastructure mode, the terminals GT1 to GT3 can access an Internet Inet (public telecommunication network) via the access point ACSP. Packets including game information, firmware update information, and the like can be transmitted between the terminals GT1 to GT3 and a game server GS connected to the Internet Inet via the access point ACSP.

The network system according to this embodiment performs game calculations that implement a match between a first group formed by the objects POB and QOB operated using the terminals GT1 and GT2 and a second group formed by the objects EOB1 and EOB2 operated using the terminals GT3 and GT4. Note that each group may be formed by one terminal (one object), and three or more groups may play a match.

When setting a different group color to each group, and displaying the position of each object of each group on the radar map, the mark is displayed in the group color. Note that the position and the enemy search range of each object that belongs to the group to which the terminal GT1 operated by the player belongs are also displayed on the screen of the terminal GT1 using the group color.

For example, the positions and the enemy search ranges PR and QR of the objects POB and QOB belonging to the group 1 are displayed on the radar map displayed on the screen of the terminal GT1.

Each terminal causes another object (i.e., a moving object operated by the player who operates another terminal) disposed in the object space to move and make a motion based on data (e.g., movement information) received via the network.

Specifically, the terminal GT1 moves the object POB in the object space based on information input from the input section, and moves the objects QOB, EOB1, and EOB2 based on movement data received from the terminals GT1, GT2, and GT3.

The terminal GT1 sets the radar map range including the object in the object space based on the position of the operation target object. Specifically, the terminal GT1 sets the radar map range including the object POB based on the position P of the object POB.

Each terminal generates the radar map image that indicates the position of the object present within the radar map range, and generates an image viewed from the virtual camera in the object space as the game image.

In this embodiment, the enemy search range is set for each object based on the position of each object. For example, the terminal GT1 belonging to the first group sets the enemy search range PR of the object POB based on the position of the object POB, and sets the enemy search range QR of the object QOB based on the position of the object QOB.

The terminal belonging to the first group also sets the enemy search range of each object belonging to the second group. Specifically, an alarm process is performed when the player object is present within the enemy search range of the object belonging to another group since the player object may be attacked by the object belonging to the other group.

When the objects EOB1 and EOB2 belonging to the second group are present within at least one of the enemy search range PR of the object POB and the enemy search range QR of the object QOB belonging to the first group, each of the terminals GT1 and GT2 belonging to the first group generates the radar map image that indicates the position of the object present within at least one of the enemy search range PR of the object POB and the enemy search range QR of the object QOB.

According to this embodiment, since the radar map image is generated based on the enemy search range when implementing a group match via the network, it is possible to provide a novel interesting network game (online game) that allows the player to cooperate with another player who operates the ally object via the network while carefully preventing a situation in which the player object is found by the enemy group.

4-2. Online Game Communication Control Example 1

Figure 19:
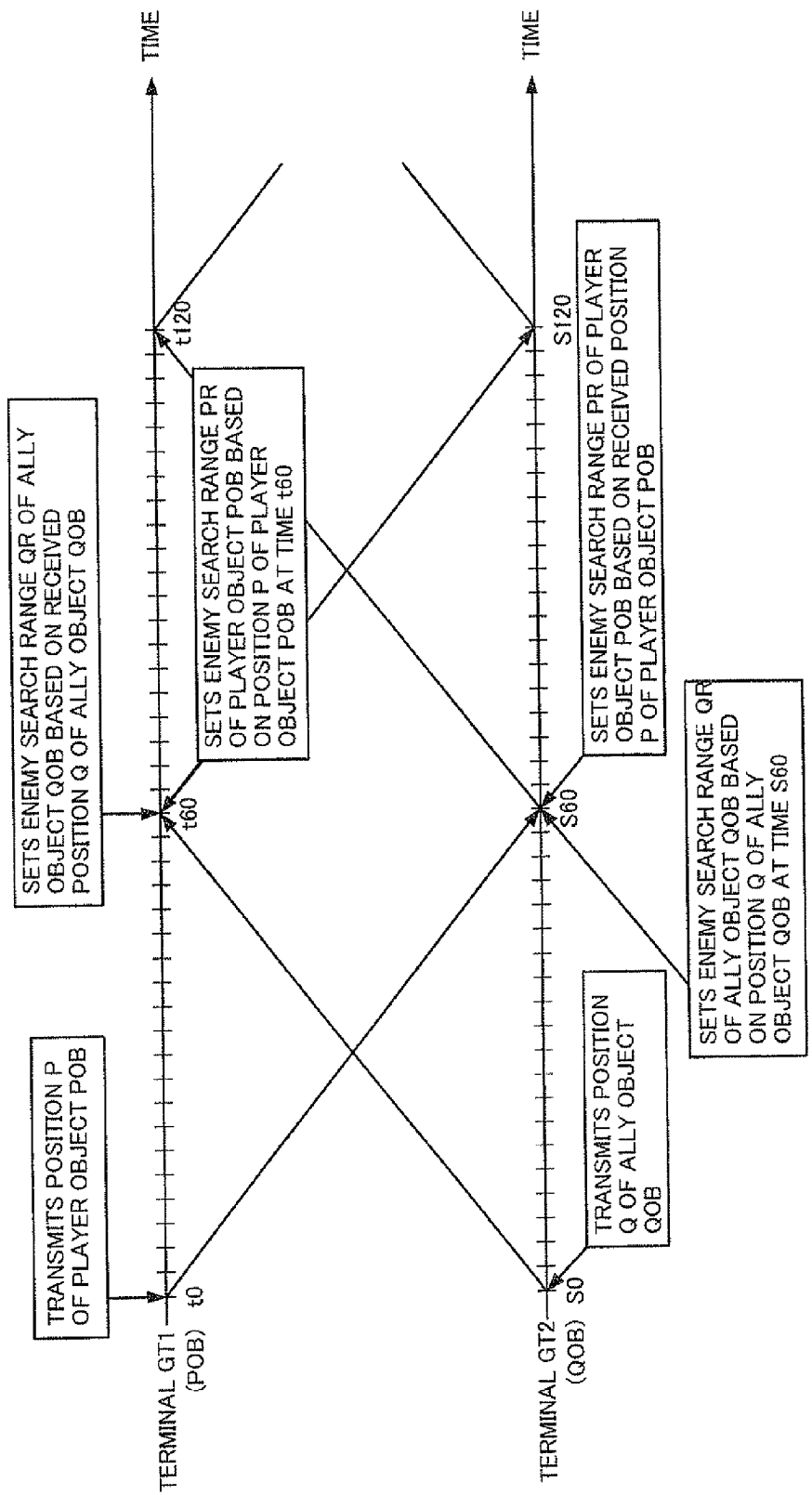
FIG. 19 is a diagram illustrating transmission and reception of data.

A communication control example of each terminal of the network system according to this embodiment is described below. For example, when the object POB operated by the terminal GT1 and the object QOB operated by the terminal GT2 belong to an identical group (ally group), the terminal GT1 transmits the position P of the object POB operated by the terminal GT1 to the terminal GT2 in a predetermined cycle (e.g., 1 sec), as illustrated in FIG. 19. The terminal GT2 also transmits the position Q of the object QOB operated by the terminal GT2 to the terminal GT1 in the same predetermined cycle.

The terminal GT1 updates the radar map image in a predetermined cycle. For example, the terminal GT1 sets the enemy search range PR of the object POB based on the position P of the object POB at a time t60, and sets the enemy search range QR of the object QOB based on the latest position Q of the object QOB that has been received up to the time t60. The terminal GT2 updates the radar map image in a predetermined cycle in the same manner as the terminal GT1. For example, the terminal GT2 sets the enemy search range QR of the object QOB based on the position P of the object QOB at a time s60, and sets the enemy search range PR of the object POB based on the latest position P of the object POB that has been received up to the time s60.

Figure 20:
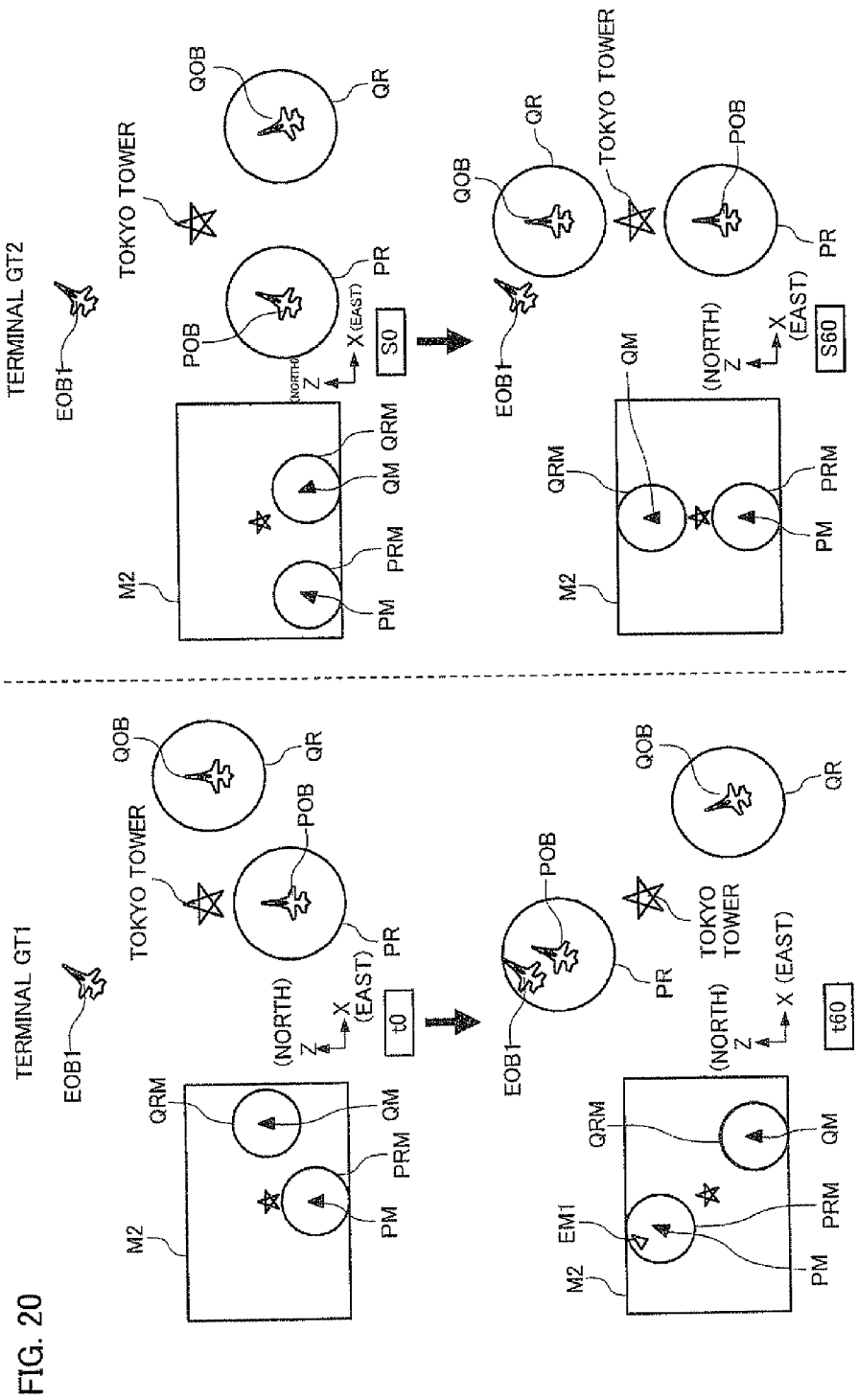
FIG. 20 is a diagram illustrating a radar map image of each terminal.

In the network system according to this embodiment, even if a time t0 is the same as a time s0, and the time t60 is the same as the time s60, the positions of the objects POB and QOB differ between the terminals GT1 and GT2 due to a communication delay (see FIG. 20). Specifically, the radar map image at an identical time differs between the terminals GT1 and GT2.

In the terminal GT1, the object POB is positioned on the south of Tokyo Tower at the time t0 (s0), and is positioned on the north of Tokyo Tower at the time t60 (s60) when 1 second has elapsed from the time t0 (see FIG. 20). The enemy object EOB1 is present within the enemy search range PR of the object POB at the time t60, and the mark EM1 of the enemy object EOB1 is displayed on the radar map M2 of the terminal GT1.

On the other hand, since the position of the object POB at the time t0 is displayed on the terminal GT2 at the time s60, the object POB is positioned on the south of Tokyo Tower. Specifically, the enemy object EOB1 is not present within the enemy search range PR of the object POB at the time s60 (=t60), and the mark EM1 of the enemy object EOB1 cannot be displayed on the radar map M2 of the terminal GT2.

Specifically, while the position of the enemy object EOB1 can be observed from the radar map displayed on the screen of the terminal GT1, the position of the enemy object EOB1 cannot be observed from the radar map displayed on the screen of the terminal GT2.

According to this embodiment, however, since the enemy object present within the enemy search range set in the object space of each terminal is reliably displayed, an enemy search range that is clear and convenient for the player can be set even if a communication delay occurs.

4-3. Online Game Communication Control Example 2

In this embodiment, the radar map image may be updated at the game image drawing frame rate. For example, when the game image is updated every 1/60th of a second (60 frames per second (fps)), the radar map image may also be updated at 60 fps.

The position data may be transmitted between the terminals GT1 and GT2 at the drawing frame rate so that the position data and the radar map image are synchronized in the terminals GT1 and GT2. According to this configuration, an identical enemy search range is necessarily obtained in the terminals GT1 and GT2, so that a more consistent game environment can be provided to the player.

Figure 21:
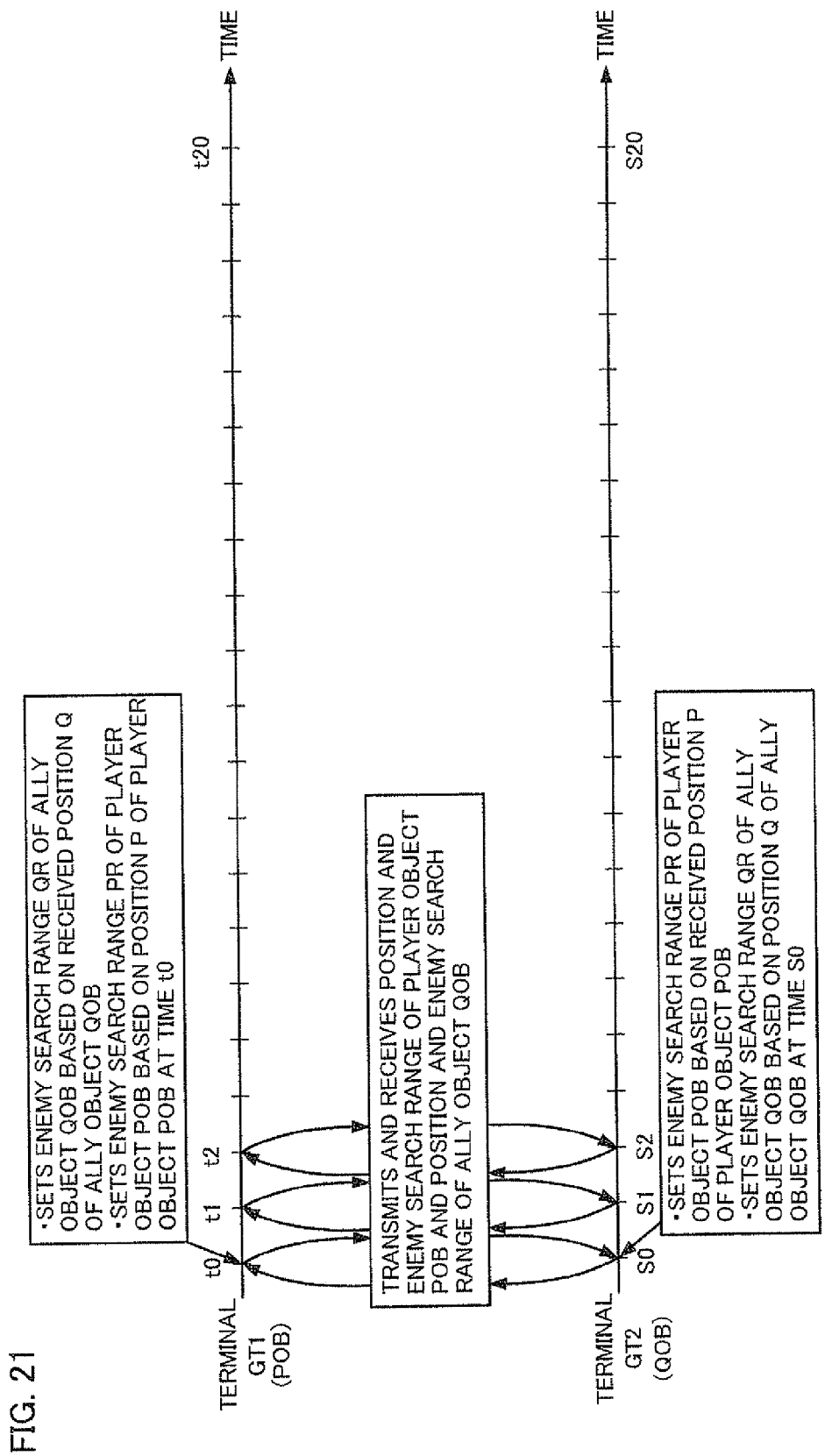
FIG. 21 is a diagram illustrating transmission and reception of data.

As illustrated in FIG. 21, the terminal GT1 transmits the position P of the object POB operated by the terminal GT1 to the terminal GT2 at the drawing frame rate (e.g., every 1/60th of a second), for example. The terminal GT2 also transmits the position Q of the object QOB operated by the terminal GT2 to the terminal GT1 at the drawing frame rate.

The terminal GT1 sets the enemy search range PR of the object POB based on the position P of the object POB at a time t0, and sets the enemy search range QR of the object QOB based on the latest position Q of the object QOB that has been received before a time t1 (next frame update time). The terminal GT2 sets the enemy search range QR of the object QOB based on the position Q of the object QOB at a time s0, and sets the enemy search range PR of the object POB based on the latest position P of the object POB that has been received before a time s1 (next frame update time).

Specifically, if data can be transmitted between the terminals GT1 and GT2 within one frame (within 1/60th of a second), the terminals GT1 and GT2 can provide a synchronized game image (see FIG. 22).

As illustrated in FIG. 22, since the positions of the objects POB and QOB displayed on the terminals GT1 and GT2 are identical when the time t0 is the same as the time s0, and the time t1 (when 1/60th of a second has elapsed from the time t0) is the same as the time s1 (when 1/60th of a second has elapsed from the time s0), the enemy search range of the object POB and the enemy search range of the object QOB can be made identical between the terminals GT1 and GT2, so that an identical radar map image can be displayed on the terminals GT1 and GT2 at an identical time.

In the terminal GT1, the object POB is positioned on the south of Tokyo Tower at the time t0 (s0), and is positioned on the north of Tokyo Tower at the time t1 (s1) when 1 second has elapsed from the time t0 (see FIG. 22). The enemy object EOB1 is present within the enemy search range PR of the object POB at the time t1, and the mark EM1 of the enemy object EOB1 is displayed on the radar map M2 of the terminal GT1.

In this case, since the position of the object POB at the time t1 is displayed on the terminal GT2 at the time s1, the object POB is positioned on the north of Tokyo Tower. Specifically, the mark EM1 of the enemy object EOB1 can be displayed on the radar map M2 displayed on the terminal GT2.

Specifically, when the position of the enemy object EOB1 can be observed from the radar map displayed on the screen of the terminal GT1, the position of the enemy object EOB1 can also be observed from the radar map displayed on the screen of the terminal GT2.

5. Alarm Process

Figure 23:
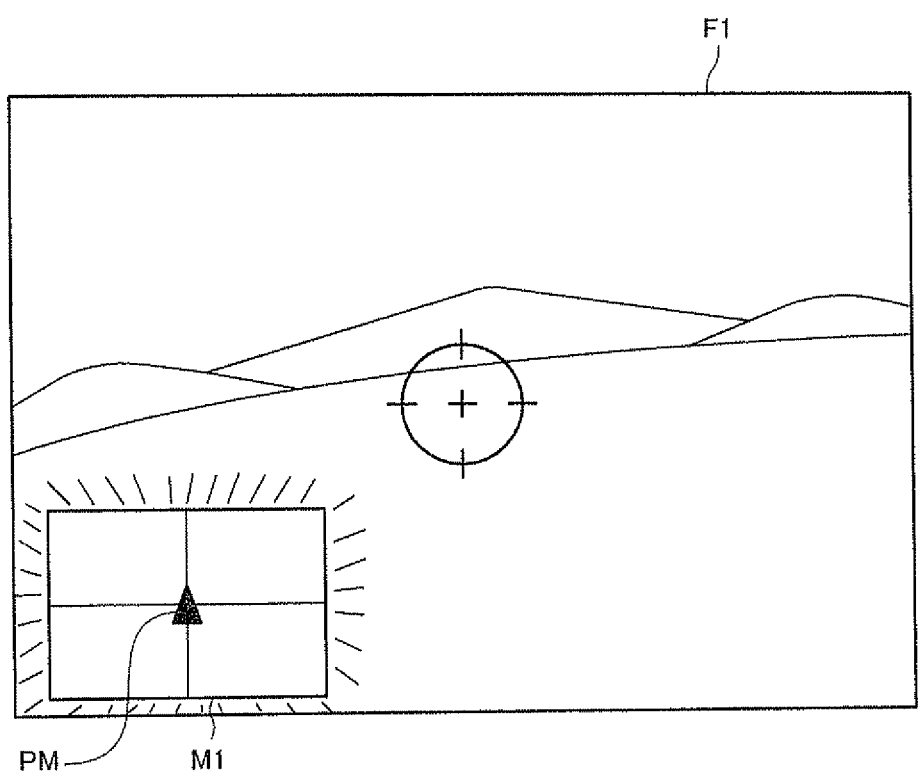
FIG. 23 is a diagram illustrating an alarm process.

In this embodiment, an alarm process is performed when the enemy search range of the enemy object is set in the object space based on the position of the enemy object, and the player object is present within the enemy search range of the enemy object. As illustrated in FIG. 23, an alarm effect process (e.g., blinking the periphery (frame) of the radar map area) is performed when the player object has entered the enemy search range of the enemy object, for example. Alternatively, an alarm sound or the like may be output when the player object has entered the enemy search range of the enemy object.

In particular, since the position of the player object POB is displayed on the radar map displayed on the screen of the terminal GT3 that operates the enemy object EOB1, the player who has observed an alarm displayed on the screen of the terminal GT1 that operates the player object POB (see FIG. 23) can prevent the player object POB from being positioned within the enemy search range of the enemy object.

When the enemy search range PR of the player object POB is smaller than the enemy search range ER of the enemy object EOB1, the player who operates the enemy object EOB1 can determined the position P of the player object POB before the enemy object EOB1 is positioned within the enemy search range PR of the player object POB. Specifically, while the position of the enemy object EOB1 is not displayed on the radar map displayed on the screen of the terminal GT1, the position of the player object POB is displayed on the radar map displayed on the screen of the terminal GT3. In this case, the player who operates the terminal GT1 can be notified that the player object POB is being targeted by the enemy object EOB1 by performing the alarm process illustrated in FIG. 23 within the screen of the terminal GT1.

6. Message Display

Figure 24:
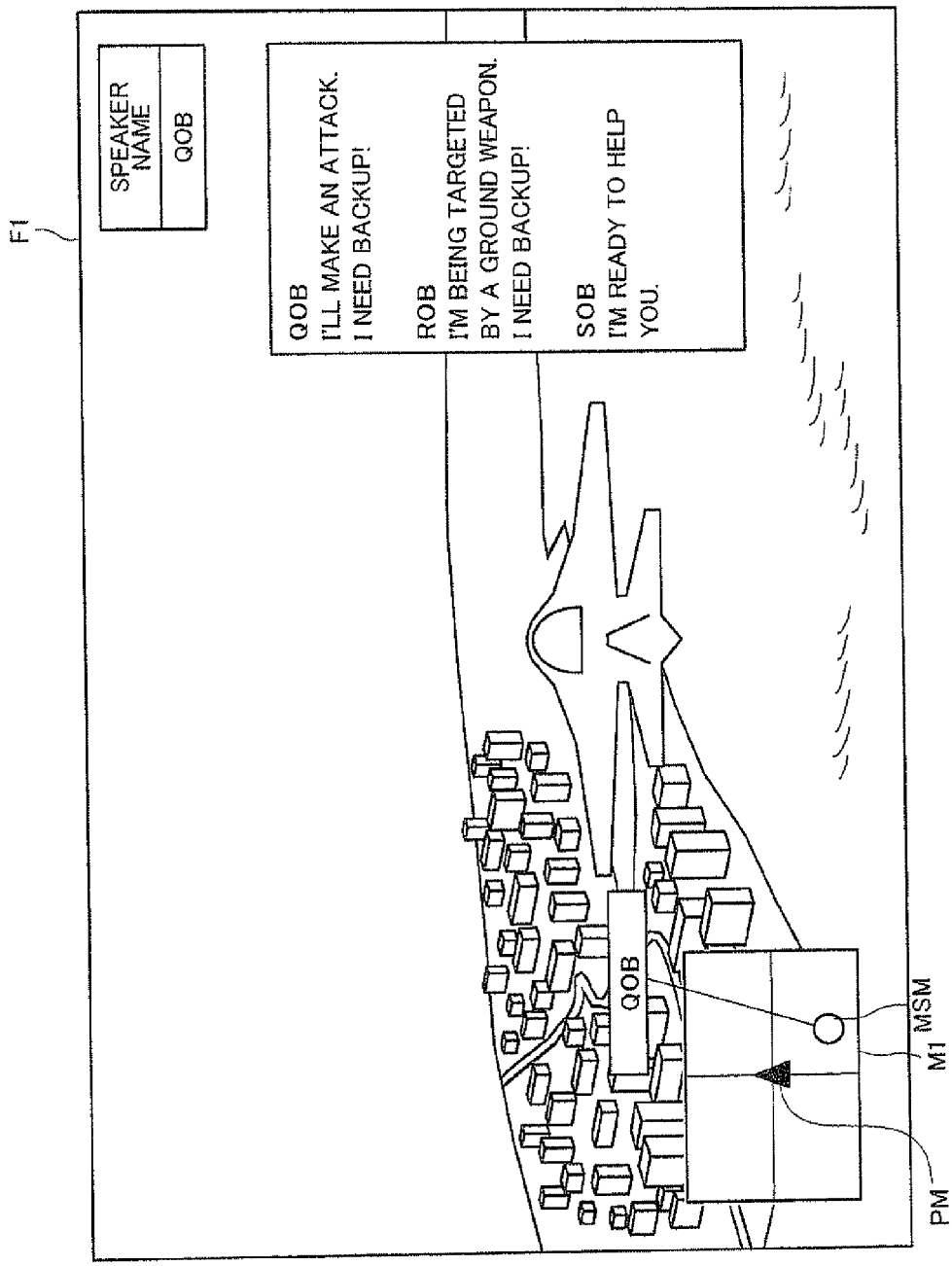
FIG. 24 is a diagram illustrating a game image and a radar map image displayed when a backup request message has been received from another terminal.

In this embodiment, messages are transmitted between the terminals belonging to an identical group during a group match. As illustrated in FIG. 24, a message received from the terminal GT2 that operates the ally object QOB and the name of the player who operates the terminal GT2 are displayed within the game image displayed on the screen of the terminal GT1 that operates the player object POB, for example. In this embodiment, the position of the object that has transmitted the message is displayed on the radar map.

As illustrated in FIG. 24, the name of the speaker (name of ally object "QOB") and the message are displayed within the game image F1, for example. A message mark MSM that indicates the position of the ally object QOB operated by the terminal GT2 is disposed on the radar map to generate the radar map image M1. Specifically, the player can easily determine the position of the ally object QOB. For example, when the player has received a message "I need backup!" from the ally object, the player can move the player object POB referring to the message mark MSM, so that more cooperative game play can be implemented.

7. Flowchart

Figure 25:
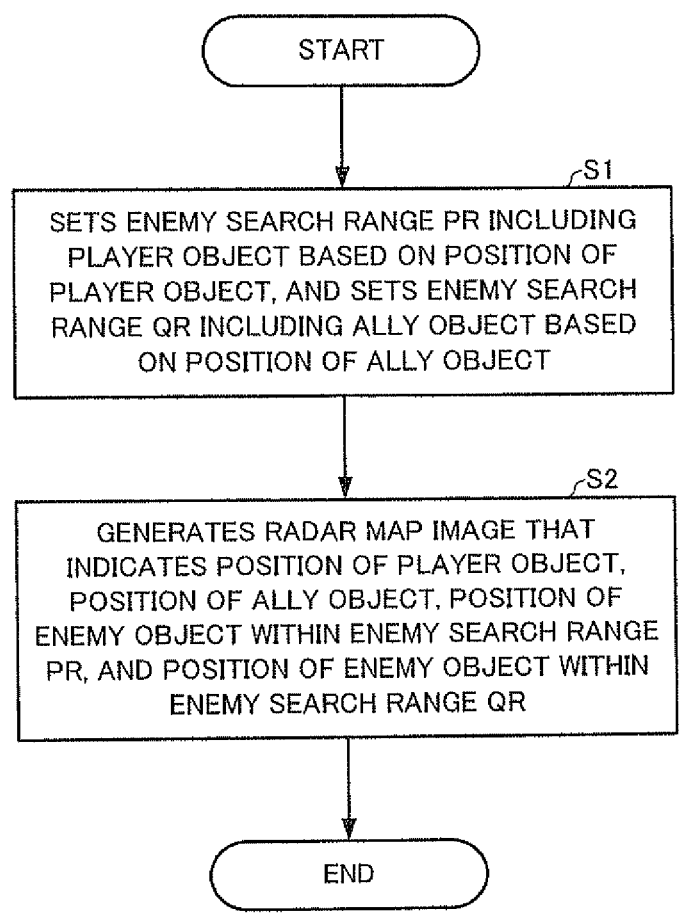
FIG. 25 is a flowchart according to one embodiment of the invention.

The flow of the process according to this embodiment is described below with reference to FIG. 25. The enemy search range PR including the player object is set based on the position of the player object, and the enemy search range QR including the ally object is set based on the position of the ally object (step S1). The radar map image that indicates the position of the player object, the position of the ally object, the position of the enemy object positioned within the enemy search range PR, and the position of the enemy object positioned within the enemy search range QR is then generated (step S2). The process is thus completed.

8. Application Example 8-1. Application Example of Network System

In the network system according to this embodiment, information about the object positioned within the enemy search range may be transmitted between the terminals via the network. For example, when the player of the terminal GT1 that operates the player object POB and the player of the terminal GT2 that operates the ally object QOB play a battle game in cooperation, the terminal GT1 transmits enemy object information (e.g., object ID) about the enemy object present within the enemy search range PR of the player object POB to the terminal GT2, and receives enemy object information about the enemy object present within the enemy search range QR of the ally object QOB from the terminal GT2. The terminal GT1 may generate the radar map image that indicates the position of the enemy object present within the enemy search range PR of the player object POB, and the position of the object corresponding to the enemy object information (object ID) received from the terminal GT2.

8-2. Enemy Object Present within Container Range

In this embodiment, the position of an enemy object present within the container range may be displayed on the radar map. Specifically, the position of an enemy object that is not present within the enemy search range in the object space, but is present within the container range may be displayed on the radar map.

8-3. Application Example of Enemy Search Range Setting Process

In this embodiment, at least one of the enemy search range PR of the player object POB and the enemy search range QR of the ally object QOB may be enlarged based on the positional relationship between the player object POB and the ally object QOB.

Figure 26A:
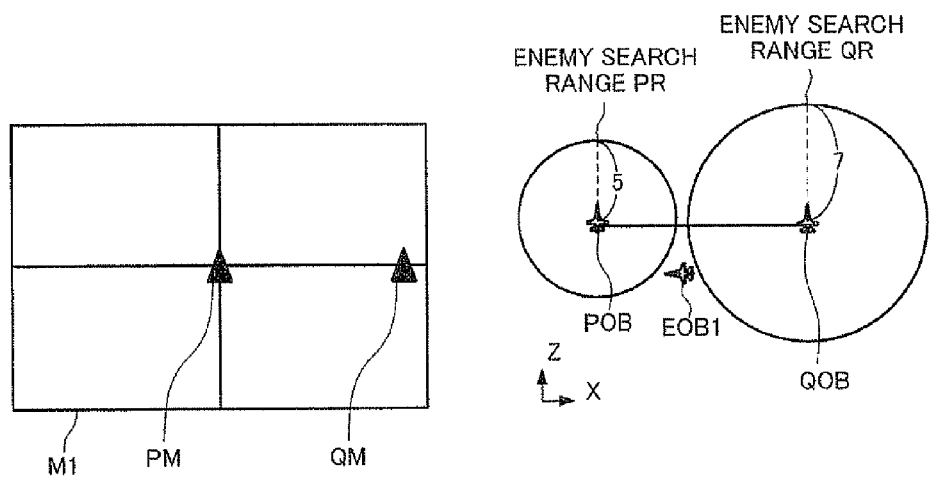
FIGS. 26A and 26B are diagrams illustrating enlargement of an enemy search range.

As illustrated in FIG. 26A, the radius r of the column set as the enemy search range of the player object POB is 5 km, the radius r of the column set as the enemy search range of the ally object QOB is 7 km, and the distance between the player object POB and the ally object QOB is equal to or longer than a predetermined distance (e.g., 8 km), for example.

Figure 26B:
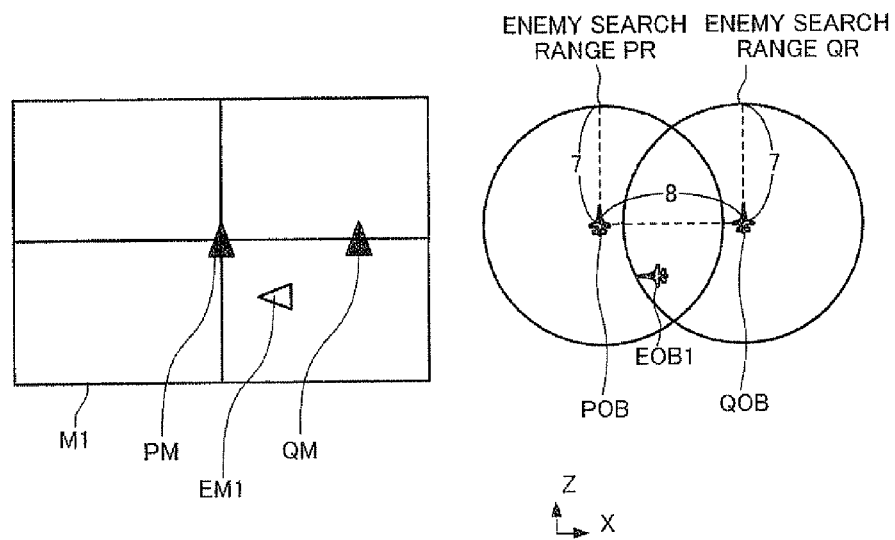

As illustrated in FIG. 26B, when the distance between the player object POB and the ally object QOB has become shorter than a predetermined distance (e.g., 8 km), the radius of the enemy search range PR of the player object POB is increased to 7 km. Specifically, the size of the enemy search range PR is made equal to the size of the enemy search range QR. Therefore, the enemy object mark EM1 is displayed on the radar map image M1 illustrated in FIG. 26B, so that the player can easily find the enemy object. This makes it possible to provide a game environment that increases unity within the group.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A non-transitory computer-readable information storage medium storing a program that generates a radar map image and a game image displayed on a screen, the program causing a computer to function as:
   a movement processing section that moves a player object in an object space based on information input from an input section;
   a setting section that sets a radar map range including the player object in the object space based on a position of the player object;
   a radar map image generation section that generates an image that indicates a position of an object within the radar map range as the radar map image;
   a game image generation section that generates an image viewed from a virtual camera in the object space as the game image; and
   a game calculation section that performs a battle game calculation process on the player object and an enemy object,
   the setting section setting a search range in the object space based on the position of the player object, the search range including the player object and being smaller than the radar map range, the setting section setting an approach range inside the search range; and
   the radar map image generation section generating the radar map image that indicates the position of the player object and a position of an enemy object within the search range, the radar map image not indicating the position of the enemy object within the search range when a special state of the enemy object is enabled, wherein the radar map image generation section disables the special state of the enemy object for which the special state has been enabled when the enemy object is within the approach range.

2. The information storage medium according to claim 1, wherein:

the game calculation section performs a battle game calculation process on an ally group and the enemy object, the ally group being formed of the player object and an ally object;

the setting section sets an ally search range in the object space based on a position of the ally object, the ally search range including the ally object and being smaller than the radar map range; and the radar map image generation section generates the radar map image that indicates a position of an enemy object within the ally search range.

3. The information storage medium according to claim 1, wherein the radar map image generation section enables the special state of a first enemy object for which the special state has been disabled when the first enemy object is within a special range that is set based on a position of a second enemy object for which the special state is enabled.

4. The information storage medium according to claim 1, wherein:

the program causes the computer to further function as a communication control section that transmits data to and receives data from a second computer via a network;

the game calculation section performs a battle game calculation process on an ally group and the enemy object, the ally group being formed by the player object and an ally object that is an object operated by the second computer;

the movement processing section moves the ally object based on movement data received from the second computer;

the setting section sets an ally search range in the object space based on position data about the ally object received from the second computer, the ally search range including the ally object and being smaller than the radar map range; and the radar map image generation section generates the radar map image that indicates a position of an enemy object within the ally search range.

5. The information storage medium according to claim 1, wherein:

the program causes the computer to further function as a communication control section that transmits data to and receives data from a third computer via a network;

the game calculation section performs a battle game calculation process on the player object and an enemy object that is an object operated by the third computer; and the movement processing section moves the enemy object based on movement data received from the third computer.

6. The information storage medium according to claim 1, wherein the setting section sets the size of the search range based on the type of the player object.

7. A terminal that generates a radar map image and a game image displayed on a screen, the terminal comprising:

a movement processing section that moves a player object in an object space based on information input from an input section;

a setting section that sets a radar map range including the player object in the object space based on a position of the player object;

a radar map image generation section that generates an image that indicates a position of an object within the radar map range as the radar map image;

a game image generation section that generates an image viewed from a virtual camera in the object space as the game image; and a game calculation section that performs a battle game calculation process on the player object and an enemy object, the setting section setting a search range in the object space based on the position of the player object, the search range including the player object and being smaller than the radar map range, the setting section setting an approach range inside the search range; and the radar map image generation section generating the radar map image that indicates the position of the player object and a position of an enemy object within the search range, the radar map image not indicating the position of the enemy object within the search range when a special state of the enemy object is enabled, wherein the radar map image generation section disables the special state of the enemy object for which the special state has been enabled when the enemy object is within the approach range.

8. An image generation method that is implemented by a terminal that generates a radar map image and a game image displayed on a screen, the image generation method comprising:

moving a player object in an object space based on information input from an input section;

setting a radar map range including the player object in the object space based on a position of the player object;

generating an image that indicates a position of an object within the radar map range as the radar map image;

generating an image viewed from a virtual camera in the object space as the game image;

performing a battle game calculation process on the player object and an enemy object;

setting a search range in the object space based on the position of the player object, the search range including the player object and being smaller than the radar map range, and setting an approach range inside the search range; and generating the radar map image that indicates the position of the player object and a position of an enemy object within the search range, the radar map image not indicating the position of the enemy object within the search range when a special state of the enemy object is enabled, wherein when the enemy object is within the approach range, the special state of the enemy object for which the special state has been enabled is disabled.

9. A network system that performs a battle game calculation process on a first object operated by a first terminal and a second object operated by a second terminal, and generates a radar map image and a game image displayed on a screen of each of the first terminal and the second terminal, each of the first terminal and the second terminal comprising:

a communication control section that transmits data to and receives data from the other terminal via a network;

a movement processing section that moves one of the first and second objects operated by the terminal in an object space based on information input from an input section, and moves the other of the first and second objects in the object space based on movement data received from the other of the first and second terminals;

a setting section that sets a radar map range including the one of the first and second objects operated by the terminal in the object space based on a position of the one of the first and second objects;

a radar map image generation section that generates an image that indicates a position of an object within the radar map range as the radar map image;

a game image generation section that generates an image viewed from a virtual camera in the object space as the game image; and a game calculation section that performs a battle game calculation process on the first object and the second object, the setting section of the first terminal setting a search range of the first object in the object space based on the position of the first object, the search range of the first object including the first object and being smaller than the radar map range, the setting section setting an approach range inside the search range of the first object;

the setting section of the second terminal setting a search range of the second object in the object space based on the position of the second object, the search range of the second object including the second object and being smaller than the radar map range, the setting section setting an approach range inside the search range of the second object;

the radar map image generation section of the first terminal generating the radar map image that indicates the position of the first object and the position of the second object within the search range of the first object, but does not indicate the position of the second object within the search range of the first object when a special state of the second object is enabled; and the radar map image generation section of the second terminal generating the radar map image that indicates the position of the second object and the position of the first object within the search range of the second object, but does not indicate the position of the first object within the search range of the second object when a special state of the first object is enabled, wherein:

the radar map image generation section disables the special state of the first object for which the special state has been enabled when the first object is within the approach range of the second object, and the radar map image generation section disables the special state of the second object for which the special state has been enabled when the second object is within the approach range of the first object.

10. A network system that performs a battle game calculation process on a first group and a third object operated by a third terminal, the first group being formed of a first object operated by a first terminal and a second object operated by a second terminal, and generates a radar map image and a game image displayed on a screen of each of the first terminal, the second terminal, and the third terminal, each of the first terminal, the second terminal, and the third terminal comprising:

a communication control section that transmits data to and receives data from each of the other terminals via a network;

a movement processing section that moves one of the first, second and third objects operated by the terminal in an object space based on information input from an input section, and moves the other two of the first, second and third objects in the object space based on movement data received from the other two of the first, second and third terminals;

a setting section that sets a radar map range including the one of the first, second and third objects operated by terminal in the object space based on a position of the one of the first, second and third objects;

a radar map image generation section that generates an image that indicates a position of an object within the radar map range as the radar map image;

a game image generation section that generates an image viewed from a virtual camera in the object space as the game image; and a game calculation section that performs a battle game calculation process on the first group and the third object, the setting section of each of the first and second terminals belonging to the first group setting each of search ranges corresponding to each object belonging to the first group in the object space based on the position of each object belonging to the first group, the search range including the object belonging to the first group and being smaller than the radar map range, the setting section setting an approach range inside each of the search ranges belonging to the first group;

the setting section of the third terminal setting a search range of the third object in the object space based on the position of the third object, the search range of the third object including the third object and being smaller than the radar map range, the setting section setting an approach range inside the search range of the third object;

the radar map image generation section of each of the first and second terminals belonging to the first group generating the radar map image that indicates the position of the object belonging to the first group and the position of the third object within the search range of at least one of the first and second objects, the radar map image belonging to the first group not indicating the position of the third object within the search ranges of the objects of the first group when a special state of the third object is enabled; and the radar map image generation section of the third terminal generating the radar map image that indicates the position of the third object and the position of the object belonging to the first group within the search range of the third object, the radar map image belonging to the third group not indicating the position of the object belonging to the first group within the search range of the third object when a special state of the object belonging to the first group is enabled, wherein:

the radar map image generation section disables the special state of the object belonging to the first group for which the special state has been enabled when the third object is within the approach range of the object belonging to the first group, and the radar map image generation section disables the special state of the third object for which the special state has been enabled when an object belonging to the first group is within the approach range of the third object.

11. A network system that performs a battle game calculation process on a first group formed of objects respectively operated by a plurality of terminals and a second group formed of objects respectively operated by a plurality of terminals, and generates a radar map image and a game image displayed on a screen of each of the terminals, each of the terminals comprising:

a communication control section that transmits data to and receives data from each of the other terminals via a network;

a movement processing section that moves one of the objects operated by the terminal in an object space based on information input from an input section, and moves the others of the objects in the object space based on movement data received from the others of the terminals;

a setting section that sets a radar map range including the one of the objects operated by the terminal in the object space based on a position of the one of the objects;

a radar map image generation section that generates an image that indicates a position of an object within the radar map range as the radar map image;

a game image generation section that generates an image viewed from a virtual camera in the object space as the game image; and a game calculation section that performs a battle game calculation process on the first group and the second group, the setting section of each of the plurality of terminals belonging to the first group setting each of search ranges corresponding to each object belonging to the first group in the object space based on the position of each object belonging to the first group, the search range including the object belonging to the first group and being smaller than the radar map range, the setting section setting an approach range inside the search ranges corresponding to each object belonging to the first group;

the setting section of each of the plurality of terminals belonging to the second group setting each of search ranges corresponding to each object belonging to the second group in the object space based on the position of each object belonging to the second group, the search range including the object belonging to the second group and being smaller than the radar map range, the setting section setting an approach range inside the search ranges corresponding to each object belonging to the second group;

the radar map image generation section of each of the plurality of terminals belonging to the first group generating the radar map image that indicates the position of the object belonging to the first group and the position of the object belonging to the second group within the search range of the object belonging to the first group, the radar map image of the object belonging to the first group not indicating the position of the object belonging to the second group within the search ranges of the objects of the second group when a special state of the object belonging to the second group is enabled; and the radar map image generation section of each of the plurality of terminals belonging to the second group generating the radar map image that indicates the position of the object belonging to the second group and the position of the object belonging to the first group within the search range of the object belonging to the second group, the radar map image of the object belonging to the second group not indicating the position of the object belonging to the first group within the search ranges of the objects of the first group when a special state of the object belonging to the second group is enabled, wherein:

the radar map image generation section disables the special state of the object belonging to the first group for which the special state has been enabled when the object belonging to the second group is within the approach range of the object belonging to the first group, and the radar map image generation section disables the special state of the object belonging to the second group for which the special state has been enabled when an object belonging to the first group is within the approach range of the object belonging to the second group.

12. The network system according to claim 9, wherein:

each of the first terminal and the second terminal further comprises an effect processing section that performs an alarm process;

the setting section of each of the first terminal and the second terminal sets a search range of an enemy object that is one of the first and the second objects operated by the other of the first and second terminals based on the position of the enemy object; and the effect processing section performs the alarm process when one of the first and second objects operated by the one of the first and second terminals is within the search range of the enemy object.

* * * * *